US012769141B2

(12) United States Patent
Yu et al.

(10) Patent No.: US 12,769,141 B2
(45) Date of Patent: Oct. 20, 2026

(54) LIGHT CONTROL FILM AND METHOD OF FABRICATING SAME

(71) Applicant: 3M INNOVATIVE PROPERTIES COMPANY, St. Paul, MN (US)

(72) Inventors: Li Yu, Santa Clara, CA (US); Garth V. Antila, Hudson, WI (US); Michael R. Berrigan, Oakdale, MN (US); Andrew C. Clausen, St. Paul, MN (US); William T. Fay, Woodbury, MN (US); Timothy J. Lindquist, Woodbury, MN (US); Tri D. Pham, Woodbury, MN (US); Samuel E. Marmon, Gallatin, TN (US); Zhaohui Yang, North Oaks, MN (US); Steven H. Kong, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 347 days.

(21) Appl. No.: 18/577,724

(22) PCT Filed: Jul. 15, 2022

(86) PCT No.: PCT/IB2022/056548
§ 371 (c)(1),
(2) Date: Jan. 9, 2024

(87) PCT Pub. No.: WO2023/002324
PCT Pub. Date: Jan. 26, 2023

(65) Prior Publication Data

US 2024/0329415 A1 Oct. 3, 2024

Related U.S. Application Data

(60) Provisional application No. 63/224,449, filed on Jul. 22, 2021.

(51) Int. Cl.
*G02B 27/09* (2006.01)
*G02B 5/00* (2006.01)

(52) U.S. Cl.
CPC ......... *G02B 27/0988* (2013.01); *G02B 5/003* (2013.01)

(58) Field of Classification Search
CPC ................ G02B 27/0988; G02B 5/003; G02B 2207/123; G02B 5/223
See application file for complete search history.

(56) References Cited

U.S. PATENT DOCUMENTS

| | | |
|---|---|---|
| 5,329,386 A | 7/1994 | Birecki et al. |
| 5,702,658 A | 12/1997 | Pellegrin et al. |

(Continued)

FOREIGN PATENT DOCUMENTS

| | | |
|---|---|---|
| CN | 112819810 B | 6/2023 |
| JP | H06-313816 A | 11/1994 |

OTHER PUBLICATIONS

Binder, "Extraction and Parametrization of Grain Boundary Networks in Glacier Ice, Using a Dedicated Method of Automatic Image Analysis", 2013, Journal of Microscopy, 2013, vol. 250, pp. 130-141.

(Continued)

*Primary Examiner* — Mariam Qureshi
(74) *Attorney, Agent, or Firm* — Theresa Stadheim

(57) ABSTRACT

A light control film includes opposing substantially planar substantially parallel first and second major surfaces spaced apart along a thickness direction of the light control film by less than about 500 microns; and a plurality of substantially parallel optically transparent polymeric columns disposed in, and substantially surrounded by, a light absorbing polymeric material. Each of the polymeric columns has a first column end at the first major surface and an opposite second (Continued)

column end at the second major surface and has an aspect ratio of greater than about 3, such that the first column ends of at least one pair of adjacent polymeric columns include substantially parallel substantially straight sides facing, and substantially coextensive with, each other.

19 Claims, 23 Drawing Sheets

(56) References Cited

U.S. PATENT DOCUMENTS

| | | | | |
|---|---|---|---|---|
| 6,465,094 | B1 | 10/2002 | Dugan | |
| 7,142,961 | B2 | 11/2006 | Gim et al. | |
| 7,622,188 | B2 | 11/2009 | Frontier | |
| 8,351,668 | B2 | 1/2013 | Naini | |
| 2008/0186558 | A1 * | 8/2008 | Lee | G02B 6/04 359/227 |
| 2013/0286326 | A1 | 10/2013 | Dunn et al. | |
| 2015/0125504 | A1 | 5/2015 | Ward et al. | |
| 2015/0331508 | A1 | 11/2015 | Nho et al. | |
| 2017/0108628 | A1 * | 4/2017 | Larsen | G02B 5/00 |
| 2018/0012069 | A1 * | 1/2018 | Chung | G06V 40/1329 |
| 2020/0285345 | A1 | 9/2020 | Xiang et al. | |

OTHER PUBLICATIONS

GÜLER, "PolyMorph-2D: An Open-source GIS Plug-in for Morphometric Analysis of Vector-based 2d Polygon Features", 2021, Geomorphology, vol. 386, 107755, pp. 1-10.

International Search Report for PCT Application No. PCT/IB2022/056548, mailed on Oct. 18, 2022, 6 pages.

Liu, "Fitting Unbranching Skeletal Structures to Objects", 2021, Medical Image Analysis, vol. 70, 102020, pp. 1-10.

Manchuk, "Boundary Modeling with Moving Least Squares", 2019, Computers and Geosciences, vol. 126, pp. 96-106.

Soille, "Physical Significance of Measurements in Images", 1994, IEEE Instrumentation and Measurement Technolgy Conference, vol. 3, pp. 1431-1434.

Tunwal, "A New Approach to Particle Shape Quantification using the Curvature Plot", 2020, Powder Technology, vol. 374, pp. 377-388.

* cited by examiner

100 y x z

LIGHT CONTROL FILM AND METHOD OF FABRICATING SAME

CROSS REFERENCE TO RELATED APPLICATIONS

This application is a national stage filing under 35 U.S.C. 371 of PCT/IB2022/056548, filed Jul. 15, 2022, which claims the benefit of U.S. Application No. 63/224,449, filed Jul. 22, 2021, the disclosures of which are incorporated by reference in their entireties herein.

SUMMARY

The present disclosure relates generally to light control films and methods of fabricating light control films. In some embodiments, a light control film includes a plurality of substantially parallel optically transparent polymeric columns disposed in, and substantially surrounded by, a light absorbing polymeric material. In some embodiments, a light control film is formed by forming an integral block from a plurality of polymeric fibers, where each fiber includes at least one substantially transparent column and a light absorbing material, and then cutting the light control film from the integral block. In some embodiments, a plurality of polymeric fibers is provided that is suitable for use in fabricating a light control film.

In some aspects of the present description, a light control film is provided. The light control film includes opposing substantially planar substantially parallel first and second major surfaces spaced apart along a thickness direction of the light control film by less than about 500 microns; and a plurality of substantially parallel optically transparent polymeric columns disposed in, and substantially surrounded by, a light absorbing polymeric material. Each of the polymeric columns has a first column end at the first major surface and an opposite second column end at the second major surface and has an aspect ratio of greater than about 3, such that the first column ends of at least one pair of adjacent polymeric columns include substantially parallel substantially straight sides facing, and substantially coextensive with, each other.

In some aspects of the present description, a light control film is provided. The light control film includes a plurality of optically transparent polymeric columns dispersed in a light absorbing polymeric medium and includes a plurality of polygonal first column ends at a same first major surface of the light control film and a plurality of polygonal second column ends at a same second major surface of the light control film.

In some aspects of the present description, a light control film is provided. The light control film includes a plurality of optically transparent spaced apart polymeric fiber cores substantially surrounded by a common light absorbing polymeric cladding. The fiber cores include corresponding fiber core ends seemingly irregularly arranged at a major surface of the light control film, such that an average radial power spectral density of the fiber core ends as a function of a spatial frequency in a cross-section of the light control film in a plane substantially orthogonal to a thickness direction of the light control film has a first peak region including one or more local peaks and defined by a full width at half maximum (FWHM) of between about 5 and about 150 inverse mm.

In some aspects of the present description, a light control film is provided. The light control film includes a plurality of optically transparent spaced apart polymeric columns substantially surrounded by a common light absorbing polymeric material, where the polymeric columns have aspect ratios greater than about 3, such that for a substantially collimated incident light having a visible wavelength in a visible wavelength range from about 420 nm to about 680 nm, an optical transmittance of the light control film versus an incident angle of the incident light has a peak transmittance of greater than about 2% with a corresponding full width at half maximum (FWHM) of between about 5 degrees and about 120 degrees.

In some aspects of the present description, a plurality of polymeric fibers extending substantially along a same first direction is provided. Each of the polymeric fibers include one or more polymeric cores surrounded by, and coextruded and substantially coextensive in length with, a polymeric cladding, such that the polymeric cladding has a thickness smaller than a maximum lateral dimension of the polymeric core, such that along the first direction, the polymeric cores are substantially more optically transparent than the polymeric claddings at at least one same visible wavelength in a visible wavelength range extending from about 420 nm to about 680 nm.

In some aspects of the present description, a light control film is provided. The light control film includes a plurality of substantially parallel optically transparent polymeric columns disposed in, and substantially surrounded by, a light absorbing polymeric material, where each of the polymeric columns has an aspect ratio of greater than about 3, such that in a cross-section of the light control film in a plane substantially orthogonal to a thickness direction of the light control film, each of the polymeric columns includes a closed perimeter. The closed perimeter of at least some of the polymeric columns include one or more substantially straight perimeter portions, such that a total length of the substantially straight perimeter portions is greater than about 10% of a total length of the closed perimeters of the polymeric columns in the plurality of polymeric columns in the cross-section.

In some aspects of the present description, a light control film is provided. The light control film includes a plurality of substantially parallel optically transparent polymeric columns disposed in, and substantially surrounded by, a light absorbing polymeric material. Each of the polymeric columns has an aspect ratio of greater than about 3. In a cross-section of the light control film in a plane substantially orthogonal to a thickness direction of the light control film, each of the polymeric columns includes one or more sides, such that for each pair in a plurality of pairs of adjacent polymeric columns, a side of one of the adjacent polymeric columns faces, and is substantially parallel and coextensive in length with, a side of the other one of the polymeric columns to form a pair of parallel sides, such that a total number of the sides of the polymeric columns that are part of a pair of parallel sides is greater than about 10% of a total number of sides in the plurality of polymeric columns in the cross-section.

In some aspects of the present description, a method of fabricating a light control film is provided. The method includes providing a plurality of substantially parallel optically transparent first polymeric columns extending along a same first direction and disposed in, and substantially surrounded by, a light absorbing polymeric material, where the first polymeric columns define a plurality of substantially optically transparent gaps therebetween; and applying at least one of pressure and heat to the plurality of first polymeric columns along at least one second direction substantially orthogonal to the first direction. Each of the first polymeric columns has a lateral cross-sectional first shape. The at least one of pressure and heat at least reduces a size of at least some of the gaps and modifies each of the first polymeric columns to a corresponding second polymeric column having a lateral cross-sectional second shape different than the cross-sectional first shape of the first polymeric column.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Figure 1:
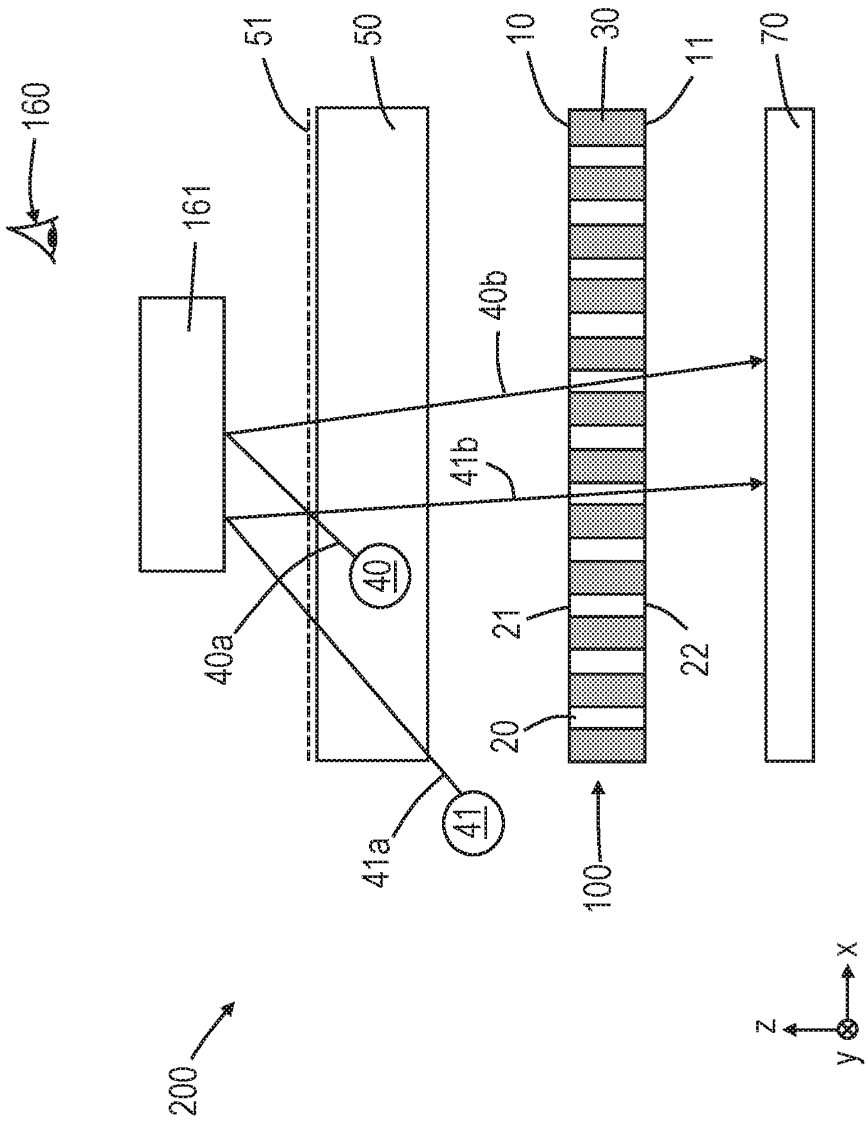
FIG. 1 is a schematic cross-sectional view of a display system including a light control film disposed between a display panel and a sensor, according to some embodiments.

The light control films described herein may be used in finger sensing applications, according to some embodiments, where the light control film is disposed between a display panel and a sensor and can be adapted to transmit light reflected from a finger to the sensor while rejecting light incident on the light control film from different angles. By at least partially collimating the light in this way, the light control film can improve image resolution, for example. Unlike typical films including aligned microlens and pinhole arrays that are sometimes used as a collimation film in fingerprint detection systems, the light control films of the present description may, according to some embodiments, have a substantially flat major surface configured to face the display panel that can be readily bonded to the display panel, for example. Another type of collimation element that may be used in fingerprint sensing applications is a glass fiber optical plate. However, such plates suffer from a low manufacturing yield resulting in a high cost. According to some embodiments of the present description, the light control film includes substantially transparent (e.g., having an average optical transmittance in a wavelength range of 420 nm to 680 nm of greater than 50%, or 60%, or 70%) polymeric columns disposed in, and substantially surrounded by (e.g., surrounded by greater than 75%, or 90%, or 95% of a circumference of the column in each cross-section orthogonal to a length of the column along greater than 75%, or 90%, or 95% of the length of the column), a light absorbing polymeric material. Such light control films can be made, according to some embodiments, by providing a plurality of polymeric bicomponent fibers, for example, fusing the fibers into an integral block, and cutting the integral block to provide the light control film. Another application of the light control films described herein, according to some embodiments, is as privacy films adapted to reduce a viewing angle of light from a display panel FIG. 1 is a schematic cross-sectional view of a display system 200, according to some embodiments. The display system 200 includes a light source 40, 41, and a light control film 100 disposed between an optical sensor 70 and a display panel 50 configured to generate an image 51 for viewing by a user 160. The light source 40, 41 is configured to emit a light 40*a*, 41*a* toward at least a finger 161 of the user 160 disposed proximate the display panel 50. The sensor 70 is configured to at least sense a presence of the finger 161 by receiving at least a portion 40*b*, 41*b* of the emitted light reflected by the finger 161. In some embodiments, the display system is configured to detect a fingerprint (e.g., for user authentication). In some embodiments, the display system 200 can detect a larger portion of the hand of the user 160 than a finger. For example, for sufficiently large display screens, the display system 200 may be configured to detect a palm print.

One of the light sources 40 and 41 may be omitted. In some embodiments, the display system 200 includes a light source 40 disposed inside the display panel 50. For example, the light source can be element(s) of an organic light emitting diode display (OLED). U.S. Pat. Appl. Pub. No. 2015/0331508 (Nho et al.), for example, describes OLED stacks incorporating near infrared (NIR) emitters for fingerprint detection. In some embodiments, the display system 200 includes a light source 41 is disposed on a lateral side of the display system 200. For example, a near infrared light emitting diode can be disposed on a side of the display panel.

The emitted light 40*a*, 41*a* may have a wavelength in a range of λ1 to λ2 (see, e.g., FIG. 4), which may be a visible or visible/NIR range where λ1 can be about 400 nm or about 420 nm and λ2 can be about 800 nm or about 700 nm or about 680 nm, for example, or which may be a NIR range where λ1 can be about 800 nm or about 850 nm and λ2 can be about 2000 nm or about 1500 nm or about 1200 nm, for example. In some embodiments, the emitted light 40*a*, 41*a* has a wavelength between about 800 nm and about 2000 nm, or about 800 nm and about 1500 nm, or about 800 nm and about 1200 nm. In some embodiments, the emitted light 40*a*, 41*a* has a wavelength between about 400 nm and about 800 nm.

Figure 2:
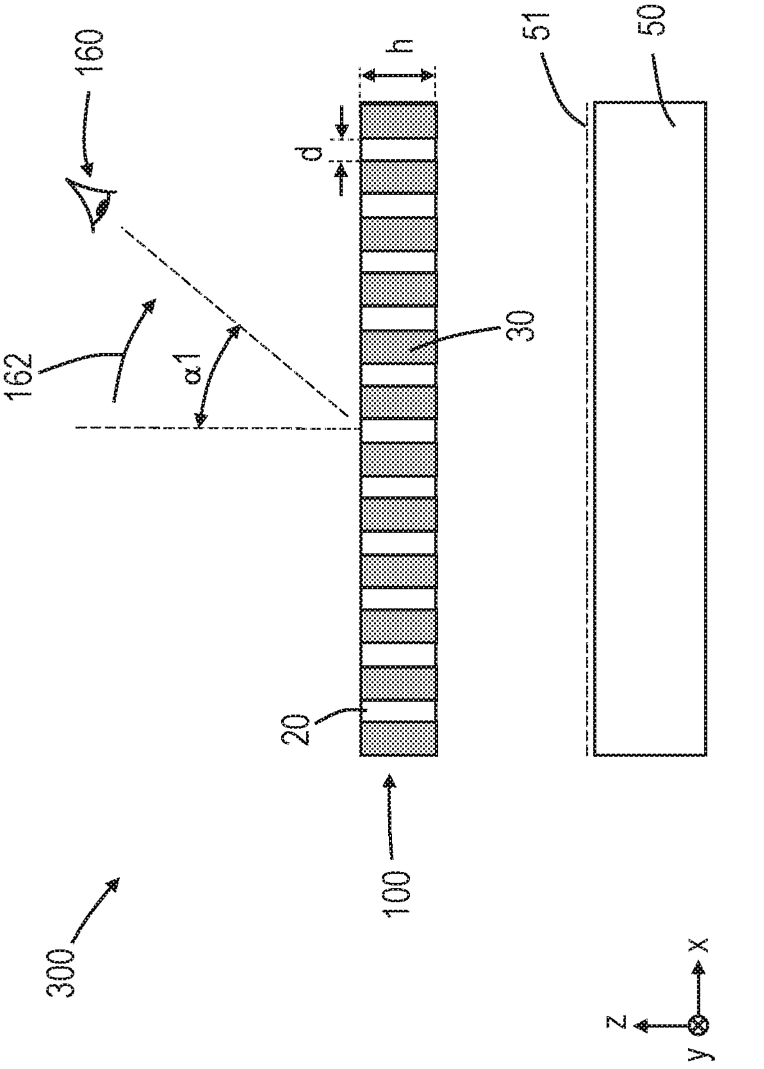
FIG. 2 is a schematic cross-sectional view of a display system including a light control film disposed between a display panel and a viewer, according to some embodiments.

The light control films described herein may be used to reduce a viewing angle of a display. For example, the light control film may be used as a privacy filter. FIG. 2 is a schematic exploded cross-sectional view of a display system 300, according to some embodiments. The display system 300 includes a display panel 50 configured to generate an image 51 for viewing by a viewer 160, and a light control film 100 disposed on, and configured to be disposed between the viewer and, the display panel. The light control film reduces a viewing angle α1 of the generated image along at least one direction (e.g., direction 162).

The display panel 50 of FIG. 1 or 2 can be an organic light emitting diode (OLED) display panel, a liquid crystal display (LCD) panel, or a micro-light emitting diode (μLED) display panel, for example.

In some embodiments, a light control film 100 includes opposing substantially planar substantially parallel first and second major surfaces 10 and 11 spaced apart along a thickness direction (z-direction referring to the x-y-z coordinate system of FIGS. 1-2) of the light control film 100 by less than about 1 mm or less than about 500 microns; and a plurality of substantially parallel optically transparent polymeric columns 20 disposed in, and substantially surrounded by, a light absorbing polymeric material 30. A substantially planar surface of a light control film may have a deviation from a planar surface of less than about 3, 2, 1, 0.5, or 0.25 times a largest lateral dimension of a column 20, for example. The substantially planar surface may be nominally planar, for example. The substantially parallel major surfaces may be within about 20, or 10, or 5 degrees of parallel, for example. The major surfaces 10 and 11 may be spaced apart by less than about 400 microns, or less than about 350 microns, for example. The major surfaces 10 and 11 may be spaced apart by at least 100 microns, or at least 150 microns, or at least 200 microns, for example. Each of the polymeric columns 20 has a first column end 21 at the first major surface 10 and an opposite second column end 22 at the second major surface 11. Each of the polymeric columns having an aspect ratio (e.g., h/d indicated in FIG. 2) of greater than about: 3, or 4, or 5, or 6, or 7, or 8, or 9, or 10, or 11, or 12, or 13, or 14, or 15, or 17, or 20, or 25. The aspect ratio can be up to about 500 or up to about 200, for example. The aspect ratio refers to the length (e.g., h) of the columns along a length direction of the columns divided by a lateral dimension of the columns in a direction orthogonal to the length direction, unless indicated otherwise. The lateral dimension may be the largest lateral dimension (e.g., d1 illustrated in FIG. 8). A high aspect ratio (e.g., greater than about 5) may be desired when a low viewing angle or a high degree of collimation is desired, while a lower aspect ratio (e.g., greater than about 3 and less than about 5) may be desired when a higher viewing angle, for example, is desired. The polymeric columns may have an in-plane aspect ratio less than 10 or less than 5, where the in-plane aspect ratio is the largest lateral dimension d1 divided by a maximum dimension in a direction orthogonal to each of the largest lateral dimension and the length direction.

The columns 20 can be substantially coextensive in length with one another. Elements extending over a length may be described as substantially coextensive with each other, or as substantially coextensive in length with each other, if greater than 50% of each element is coextensive with greater than 50% by length of each other element. Elements extending over an area may be described as substantially coextensive with each other if greater than 50% by area of each element is coextensive with greater than 50 percent by area of each other element. In some embodiments, for at least a majority of the columns 20, greater than about 60%, or greater than about 80%, or greater than about 90%, or greater than about 95% of a length of each column is coextensive with greater than about 60%, or greater than about 80%, or greater than about 90%, or greater than about 95% of a length of each other column.

Figure 3:
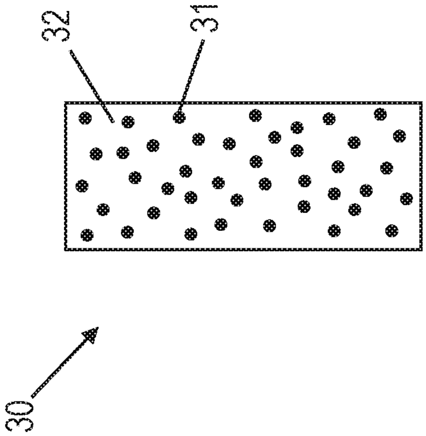
FIG. 3 is a schematic cross-sectional view of a light absorbing material, according to some embodiments.

FIG. 3 is a schematic cross-sectional view of light absorbing polymeric material 30, according to some embodiments. A polymeric material is a material including a continuous phase of organic polymer, unless indicated differently. A polymeric material may include inorganic material in a polymer matrix, for example. The light absorbing polymeric material 30 includes a plurality of light absorbing particles 31 dispersed in an optically transparent binder 32. In this context, a particle 31 may be a dye molecule, for example, or a pigment particle, for example. The light absorbing particles 31 may also partially reflect and/or diffuse light in addition to absorbing light (e.g., at least one wavelength in a visible range of 400 nm to 700 nm). In some embodiments, the light absorbing particles includes dark pigments or dark dyes such as black or gray pigments or dyes; metal such as aluminum, silver, etc.; dark metal oxides; or a combination thereof. Suitable light absorbing particles 31 include carbon black. Other suitable dyes and pigments may include, for example, one or more of Disperse Blue 60 ($C_{20}H_{17}N_3O_5$; CAS Number 12217-80-0); Pigment Yellow 147 ($C_{37}H_{21}N_5O_4$; CAS Number 4118-16-5); red azo dyes such as Red Dye 40 ($C_{18}H_{14}N_2Na_2O_8S_2$; CAS Number 25956-17-6); anthraquinone dyes pr pigments such as Solvent Yellow 163 ($C_{26}H_{16}O_2S_2$; CAS Number 13676-91-0), Pigment Red 177 ($C_{28}H_{16}N_2O_4$; CAS Number 4059-63-2), and Disperse Red 60 ($C_{20}H_{13}NO_4$; CAS Number 12223-37-9); perylene dyes or pigments such as Pigment Black 31 ($C_{40}H_{26}N_2O_4$; CAS Number 67075-37-0), Pigment Black 32 ($C_{40}H_{26}N_2O_6$; CAS Number 83524-75-8), and Pigment Red 149 ($C_{40}H_{26}N_2O_4$; CAS Number 4948-15-6); and the blue, yellow, red and cyan dyes PD-325H, PD-335H, PD-104 and PD-318H, respectively, available from Mitsui Fine Chemicals, Tokyo Japan. In some cases, a mixture of such dyes or pigments may be used to achieve optical absorption throughout a desired wavelength range (e.g., a visible wavelength range extending at least from 420 nm to 680 nm). In some embodiments, the light absorbing particles 31 include one or more of a light absorbing pigment, a light absorbing dye, and a carbon black.

In some embodiments, at least one of the plurality of polymeric columns 20 and the light absorbing polymeric material 30 (e.g., the binder 32 of the material 30) includes one or more of a polycarbonate, a polyester, an acrylic, a polyethylene terephthalate (PET), a polymethylmethacrylate (PMMA), a polyethylene naphthalate (PEN), a polybutylene terephthalate (PBT), polytrimethyleneterephthalate (PTT), a polyphenylene sulphone (PPSU), a polyether sulphone (PES), a polyphenylene sulfide (PPS), a polyetherimide (PEI), a sulfonated polysulfone (SPSU), polypropylene, a polyethylene (PE), a low density polyethylene (LDPE), an expanded polypropylene (EPP), a polylactide (PLA), a cyclic olefin, a polyurethane, a cellulose acetate (CA), a cellulose acetate butyrate (CAB), a cellulose acetate propionate (CAP), a styrene-butadiene-styrene (SBS), a styrene-ethylene-butadiene-styrene (SEBS), a nylon (also known as a polyamide (PA)), a polyurea, a rayon, a polyvinyl chloride (PVC), a polyvinylidene chloride (PVDC), a polybutylene (PB), a polymethyl pentane (e.g., TPX), a polytene, a polynorbornene, a polyvinyl alcohol (PVOH), a polyvinyl acetate (PVA), a polyaramid, a meta-aramid, a polybenzoxazole (PBO), a polybenzimidazole (PBI), a polyhydroquinone-diimidazopyridine (PIPD), a thermotropic liquid crystalline polymer (TLCP), and any copolymers thereof. LDPE is a grade of polyethylene characterized by a density in a range of about 910 to 940 kg/$m^3$ or about 917 to 930 kg/$m^3$.

Figure 4:
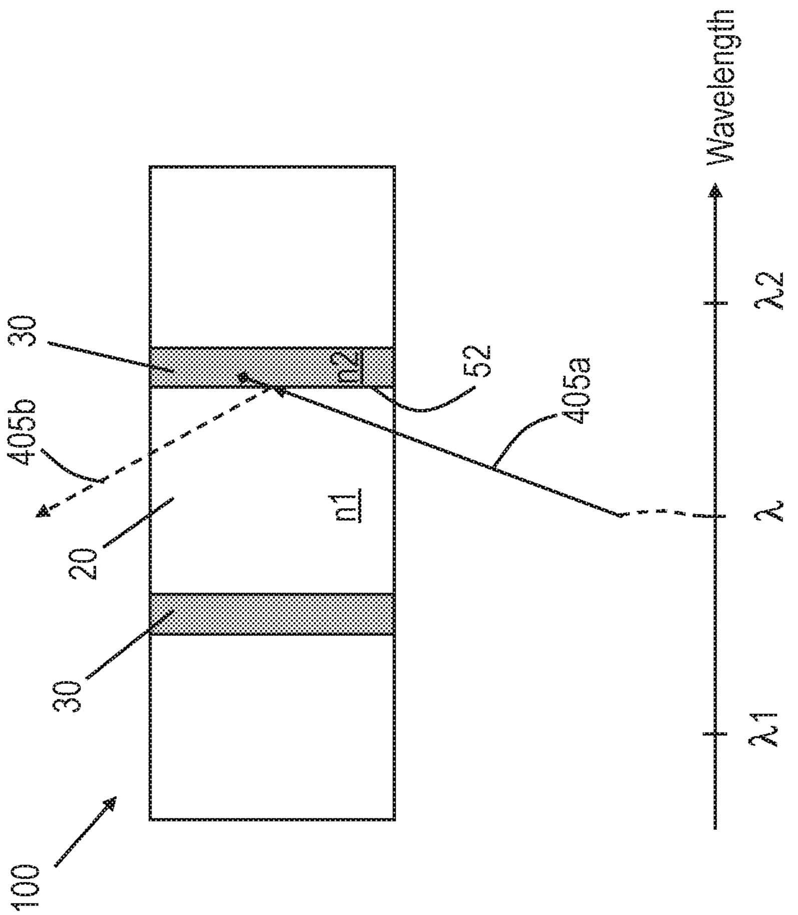
FIG. 4 is a schematic illustration of light incident on a portion of a light control film, according to some embodiments.

FIG. 4 is a schematic illustration of light 405*a* incident on a portion of a light control film 100, according to some embodiments. The light 405*a* has a wavelength k in a range of 11 to λ2, which may be a range of about 400 nm to about 700 nm, or about 420 nm to about 680 nm, or about 450 nm to about 650 nm, for example. The polymeric columns 20 have an index of refraction n1 for the wavelength k and the light absorbing material 30, or a binder component of the light absorbing material 30, has an index of refraction n2 for the wavelength k. The index of refraction n1, n2 refers to the real part of the index, unless indicated differently. The polymeric columns 20 and the light absorbing material 30 may be selected to reduce or eliminate total internal reflection so that the light 405*a* is substantially absorbed by the light absorbing material 30 instead of being reflected at an interface 52 between polymeric columns 20 and the light absorbing material 30 as reflected light 405*b*. For example, an index of refraction of the polymeric columns may be less than or approximately equal to an index of refraction of the binder. In some embodiments, for at least one wavelength (e.g., k) in a visible wavelength range extending from about 420 nm to about 680 nm (or from λ1 to λ2), an index of refraction of the polymeric columns is less than an index of refraction of the binder. In some embodiments, for at least one wavelength in a visible wavelength range extending from about 420 nm to about 680 nm (or from λ1 to λ2), an index of refraction of the polymeric columns is greater than an index of refraction of the binder. In some embodiments, for at least one wavelength in a visible wavelength range extending from about 420 nm to about 680 nm, a magnitude of a difference between an index of refraction of the polymeric columns and an index of refraction of the binder is less than about 0.01, or 0.005, or 0.001. In some embodiments, interfaces 52 between the light absorbing polymeric material 30 and the polymeric columns 20 do not cause total internal reflection.

The column ends 21 (resp., 22) may cover a substantially larger fraction (by area) of the major surface 10 (resp., 11) than schematically illustrated in FIGS. 1 and 2, for example. Larger area fractions are schematically illustrated in FIG. 4, for example (see also FIGS. 9A-9B, for example). In some embodiments, the first column ends 21 cover at least 40%, or 45%, or 50%, or 60%, or 65%, or 70%, or 75%, or 80%, or 85% of the first major surface 10. The first column ends 21 may cover up to 95%, or up to 90% of the first major surface 10, for example. In some embodiments, the second column ends 22 cover at least 40%, or 45%, or 50%, or 60%, or 65%, or 70%, or 75%, or 80%, or 85% of the second major surface 11. The second column ends 22 may cover up to 95%, or up to 90% of the second major surface 11, for example.

Figure 5:
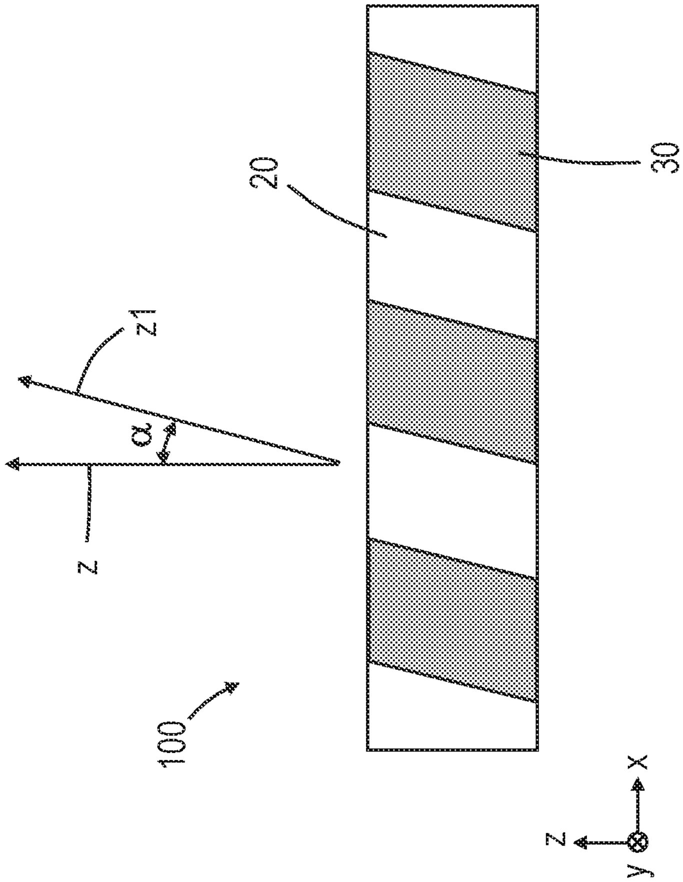
FIG. 5 is a schematic cross-sectional view of a light control film, according to some embodiments.

In some embodiments of the light control film 100, the polymeric columns 20 are tilted relative to the thickness direction of the light control film 100. FIG. 5 is a schematic cross-sectional view of a light control film 100, according to some embodiments. In some embodiments, in at least one cross-section of the light control film 100 in a plane (e.g., xz-plane) comprising the thickness direction (z-direction), the polymeric columns generally extend along a first direction (z1) making an angle α of between about 2 degrees and about 60 degrees, or about 2 degrees and 50 degrees, or about 3 degrees and 50 degrees, or about 4 degrees and 40 degrees, or about 5 degrees and 40 degrees with the thickness direction. In other embodiments, the angle α may be about 0 degrees. In some embodiments, in at least one cross-section of the light control film 100 in a plane comprising the thickness direction (z-direction), the polymeric columns generally extend along a direction substantially parallel (e.g., within about 20, 10, 5, 3, 2, or 1 degrees of parallel) to the thickness direction (z-direction).

Figure 6:
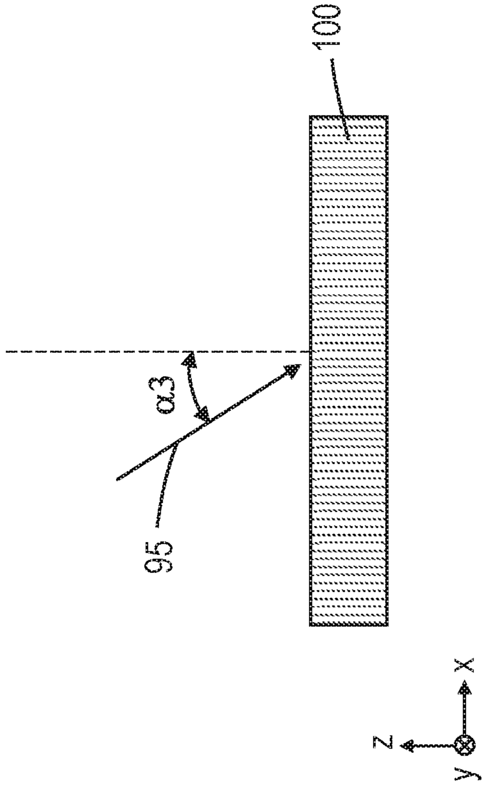
FIG. 6 is a schematic cross-sectional view of light incident on a light control film at an incident angle, according to some embodiments.
Figure 7:
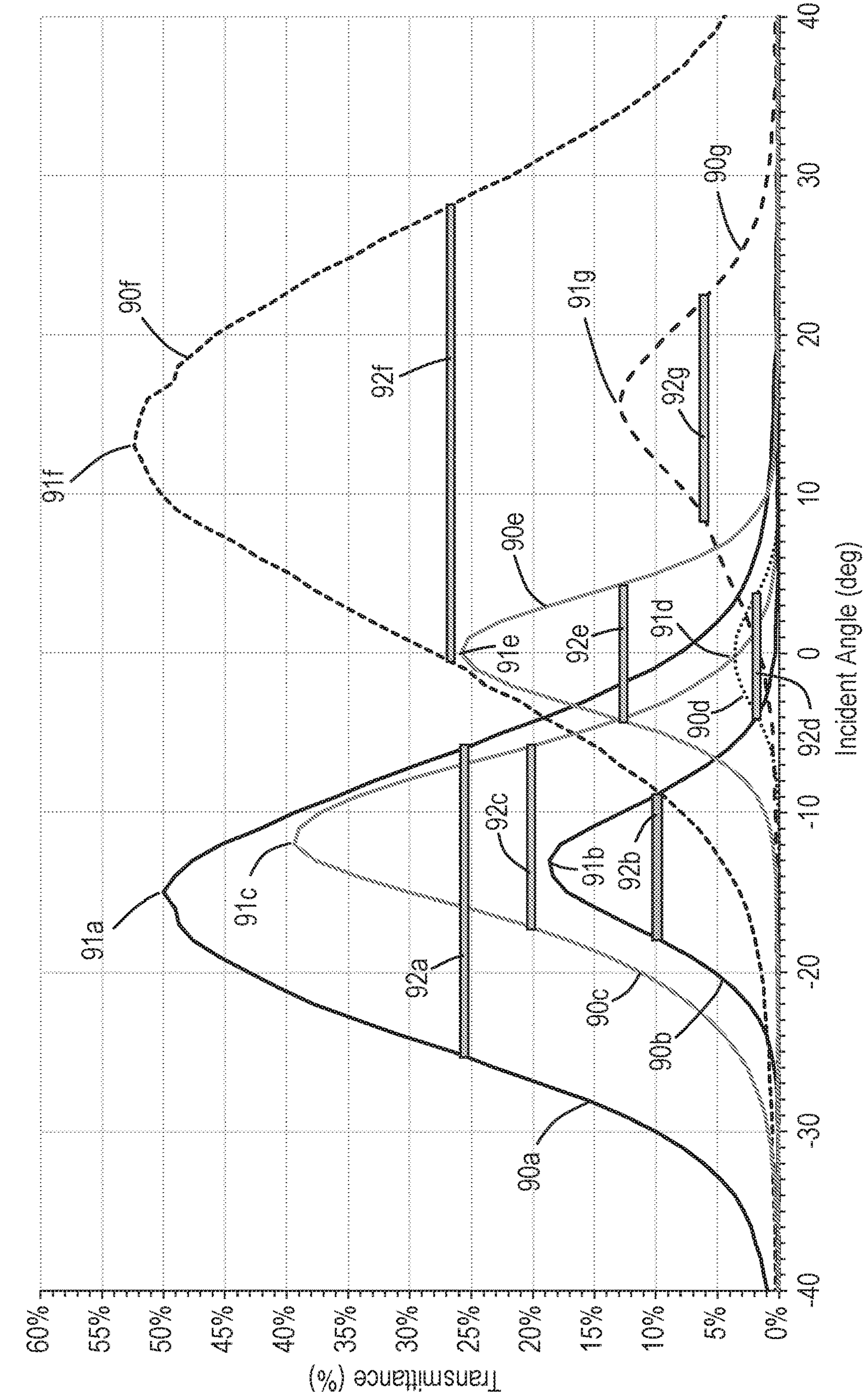
FIG. 7 is a plot of transmittance versus incident angle for various exemplary light control films.

FIG. 6 is a schematic cross-sectional view of a substantially collimated incident light 95 incident on a light control film 100 at an incident angle α3 (angle with normal to the major surface on which the light is incident), according to some embodiments. FIG. 7 is a plot of transmittance versus incident angle for various exemplary light control films. The substantially collimated light 95 can have a divergence or convergence angle that is less than about 20, 10, 5 or 3 degrees, and/or that is small compared to a full width at half maximum (e.g., less than 20% or 10% or 5% of the full width at half maximum) of a transmittance through the light control film versus incident angle.

In some embodiments, a light control film 100 includes a plurality of optically transparent spaced apart polymeric columns 20 substantially surrounded by a common light absorbing polymeric material 30, where the polymeric columns have aspect ratios greater than about 3 (or in a range described elsewhere herein), such that for a substantially collimated incident light 95 having a visible wavelength (e.g., λ) in a visible wavelength range from about 420 nm to about 680 nm (or from λ1 to λ2), an optical transmittance 90*a*-90*g* of the light control film 100 versus an incident angle α3 of the incident light has a peak transmittance 91*a*-91*g* of greater than about 2% with a corresponding full width at half maximum (FWHM) 92*a*-92*g* of between about 5 degrees and about 120 degrees. In some such embodiments, the peak transmittance 91*a*-91*g* is greater than about: 5%, or 10%, or 15%, or 20%, or 25%, or 30%, or 35%. The peak transmittance may be up to about 80%, or up to about 70%, or up to about 60% for example. In some such embodiments, or in other embodiments, the corresponding FWHM 92*a*-92*g* is between about 10 degrees and about 100 degrees, or between about 10 degrees and about 80 degrees, or between about 10 degrees and about 70 degrees, or between about 10 degrees and about 60 degrees, or between about 10 degrees and about 50 degrees, or between about 15 degrees and about 45 degrees, for example. The desired range of the FWHM may be such that a sufficient quantity of light is transmitted through the light control film (e.g., the FWHM can be at least about 10 degrees, or at least about 15 degrees, or at least about 20 degrees, for example) and such that incident angles greater than a predetermined amount are substantially not transmitted (e.g., the FWHM can be no more than about 120 degrees, or no more than about 80 degrees, or no more than about 50 degrees, for example). In some embodiments, the peak transmittance corresponds to an incident angle of less than about 5 degrees, or less than about 3 degrees, or less than about 2 degrees. In some embodiments, the peak transmittance corresponds to an incident angle of greater than about 5 degrees, or greater than about 10 degrees, or greater than about 15 degrees. The peak transmittance may correspond to an incident angle of up to about 50 degrees, or up to about 45 degrees, or up to about 40 degrees, or up to about 35 degrees, for example. In some embodiments, the optical transmittance versus incident angles is averaged over azimuthal angles. In some embodiments, the optical transmittance of the light control film 100 versus incident angle has a FWHM in any of these ranges for each of two orthogonal incident planes. An incident plane is a plane comprising the thickness direction (z-direction) and the direction of the incident light (e.g., 95). The two orthogonal incident planes can be the xz plane and the yz plane, for example.

Figure 8:
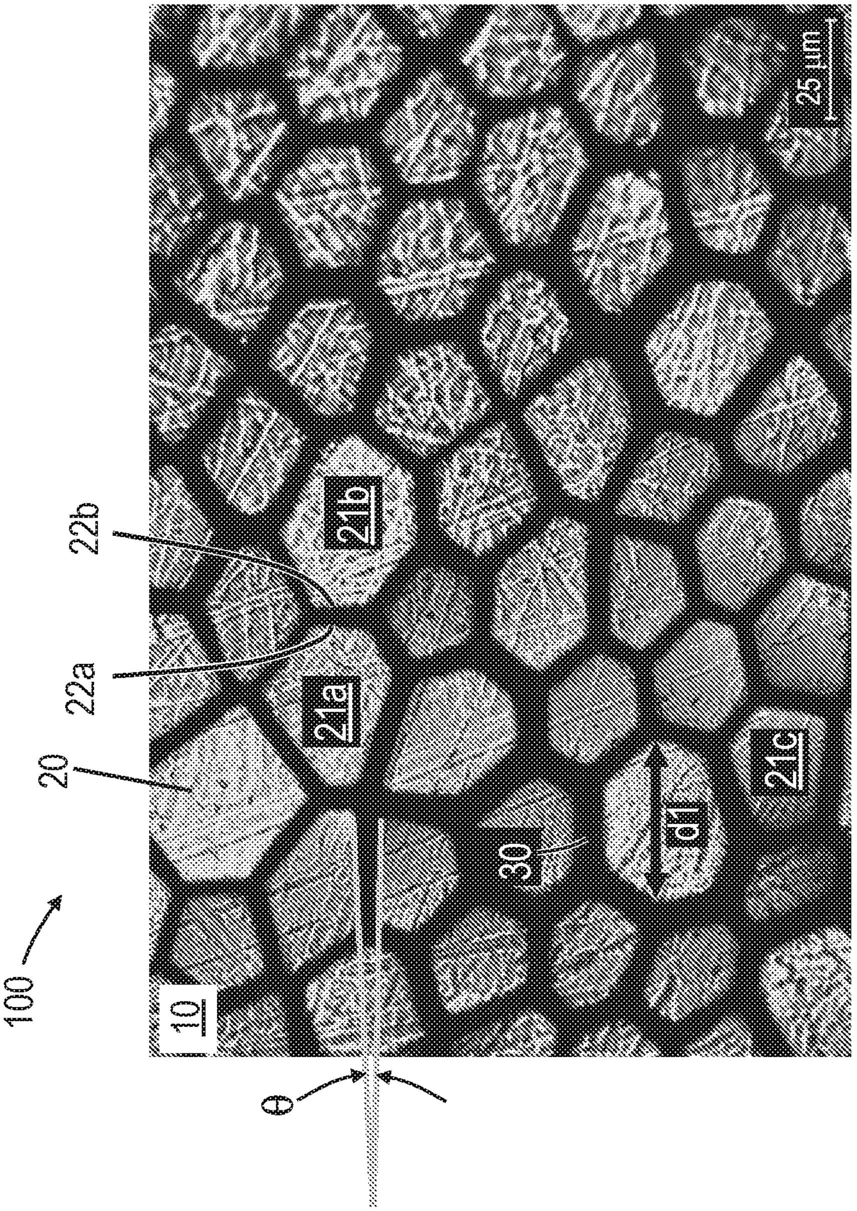
FIG. 8 is an image of an end view of a portion of a major surface of a light control film, according to some embodiments.

FIG. 8 is an image of an end view of a portion of a major surface 10 of a light control film, according to some embodiments. In some embodiments, the first column ends of at least one pair 21*a*, 21*b* of adjacent polymeric columns has substantially parallel substantially straight sides 22*a*, 22*b* facing, and substantially coextensive (e.g., each side can have a length coextensive with greater than 50%, or 60%, or 70%, or 80% of a length of the other element) with, each other. In some embodiments, the substantially parallel substantially straight sides form an angle θ of less than about: 24, 21, 18, 15, 12, 10, 8, 6, 5, 4, 3, or 2 degrees with one another. In some embodiments, the first column ends of each of at least 10%, or 15%, or 20%, or 25%, or 30%, or 35%, or 40%, or 45% of pairs of adjacent polymeric columns (e.g., 21*a*, 21*b*) have substantially parallel substantially straight sides (e.g., 22*a*, 22*b*) facing, and substantially coextensive with, each other. The percent of the pairs of adjacent polymeric columns that have substantially parallel substantially straight sides (e.g., 22*a*, 22*b*) facing, and substantially coextensive with, each other may be up to 100%, or 90%, or 80%, or 70%, or 60%, or 50%, for example. The second column ends may have substantially parallel substantially straight sides that also have these properties. The geometry of the column ends can be analyzed using standard image analysis techniques (e.g., using MATLAB). A substantially straight side may have a smallest radius of curvature greater than about 3, 4, 5, 10, or 20 times a length of the side, for example, and/or greater than about 3, 4, 5, 10, or 20 times an effective radius of the column end, for example, where the effective radius is half of a largest lateral dimension of the column end.

In some embodiments, at least one of the first and second column ends 21, 22 has an average longest lateral dimension d1 of between about 2 microns and about 100 microns, or about 3 microns and about 90 microns, or about 4 microns and about 80 microns, or about 5 microns and about 70 microns, or about 5 microns and about 60 microns, or about 5 microns and about 50 microns, or about 6 microns and about 40 microns, or about 6 microns and about 30 microns, or about 7 microns and about 30 microns. The average longest lateral dimension is the average (mean) of the longest lateral dimension (direction orthogonal to the length direction of the columns) of the column ends.

In some embodiments, a light control film 100 includes a plurality of optically transparent polymeric columns 20 dispersed in a light absorbing polymeric medium 30 and including a plurality of polygonal first column ends 21 at a same first major surface 10 of the light control film and a plurality of polygonal second column ends 22 at a same second major surface 11 of the light control film. The polymeric columns 20 can be substantially parallel with each other. In some embodiments, the polygonal first column ends have at least four sides. In some embodiments, the polygonal second column ends have at least four sides. In some embodiments, at least two of the column ends 21*a*, 21*b* of at least one of the polygonal first column ends and the polygonal second column ends have a same number of sides and different shapes. In some embodiments, at least two of the column ends 21*a*, 21*c* of at least one of the polygonal first column ends and the polygonal second column ends have different number of sides. In some embodiments, at least some of the polygonal first and second column ends have four sides, at least some of the polygonal first and second column ends have five sides, and at least some of the polygonal first and second column ends have six sides.

Figure 9A:
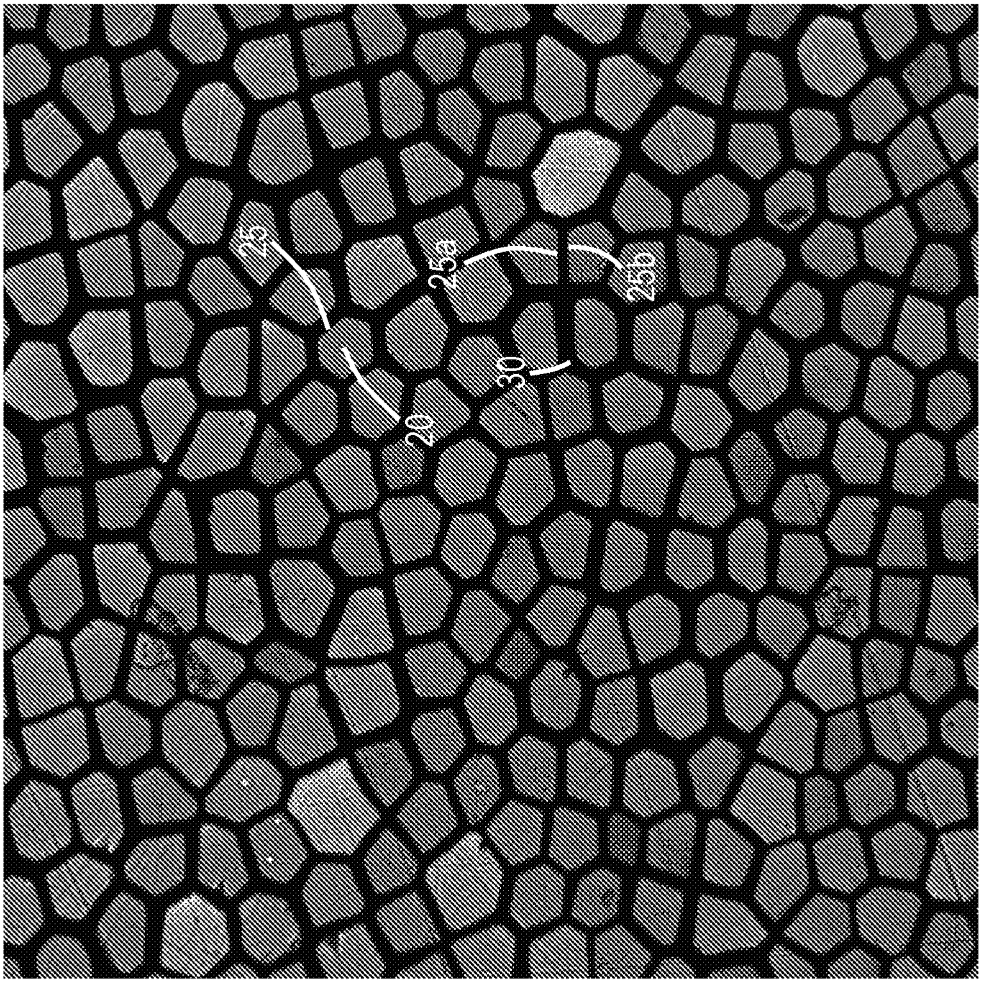
FIGS. 9A-9B are images of cross-sections of portions of light control films, according to some embodiments.
Figure 9B:
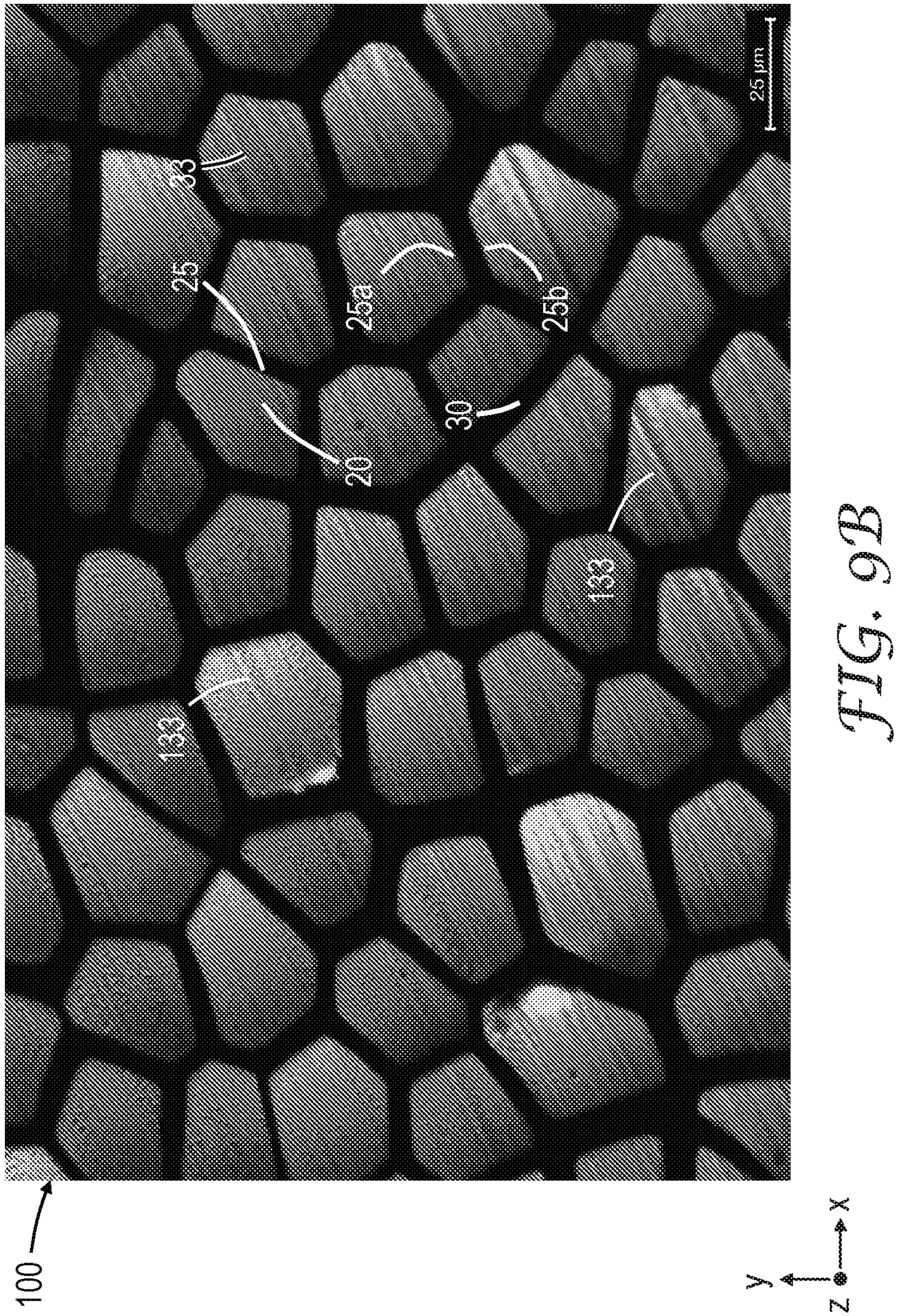

FIG. 9A is an image of a cross-section of a portion of a light control film in a plane (xy-plane) substantially orthogonal to a thickness direction (z-direction) of the light control film 100, according to some embodiments. The cross-section may be along a major surface 10, 11 of the light control film, for example. FIG. 9B is an image of a cross-section of a portion of a light control film in a plane (xy-plane) substantially orthogonal to a thickness direction (z-direction) of the light control film 100, according to some embodiments. The surface of FIG. 9A was polished while the surface of FIG. 9B shows texture 33 and substantially straight substantially parallel features 133 imparted to the surface by cutting (skiving in the illustrated embodiment).

In some embodiments, a light control film 100 includes a plurality of substantially parallel optically transparent polymeric columns 20 disposed in, and substantially surrounded by, a light absorbing polymeric material 30. Each of the polymeric columns 20 can have an aspect ratio of greater than about 3 or in a range described elsewhere herein. In some embodiments, in a cross-section of the light control film 100 in a plane (xy-plane) substantially orthogonal to a thickness direction (z-direction) of the light control film 100, each of the polymeric columns 20 has one or more sides 25, such that for each pair in a plurality of pairs of adjacent polymeric columns, a side 25*a* of one of the adjacent polymeric columns faces, and is substantially parallel and coextensive in length with, a side 25*b* of the other one of the polymeric columns to form a pair of parallel sides, such that a total number of the sides of the polymeric columns that are part of a pair of parallel sides is greater than about 10%, or 15%, or 20%, or 25%, or 30%, or 40%, or 45% of a total number of sides in the plurality of polymeric columns in the cross-section. The total number of the sides of the polymeric columns that are part of a pair of parallel sides may be up to 100%, or 90%, or 80%, or 70%, or 60%, or 50% of the total number of sides, for example. The geometry of the column ends can be analyzed using standard image analysis techniques (e.g., using MATLAB).

As described further elsewhere herein, in some embodiments, the light control film 100 is formed by cutting (e.g., with blade 157 schematically illustrated in FIG. 21), at least once, a block (e.g., integral block 260 schematically illustrated in FIG. 21) that includes a plurality of substantially parallel optically transparent polymeric columns 20 disposed in, and substantially surrounded by, a light absorbing polymeric material 30, where the cutting results in at least one of the first and second major surfaces 10 and 11. In some embodiments, the cutting imparts a pattern including a plurality of substantially straight substantially parallel features 133 (see, e.g., FIG. 9B) to the at least one of the first and second major surfaces. The cutting may also impart a pattern of other features that may be not substantially parallel to the features 133. In some embodiments, the cutting includes one or more of skiving, dicing, sawing, and laser cutting. In some embodiments, the cutting imparts a surface roughness to at least one of the first and second column ends of at least one of the polymeric columns. For example, the texture 33 of FIG. 9B can indicate a surface roughness imparted by cutting.

Figure 10:
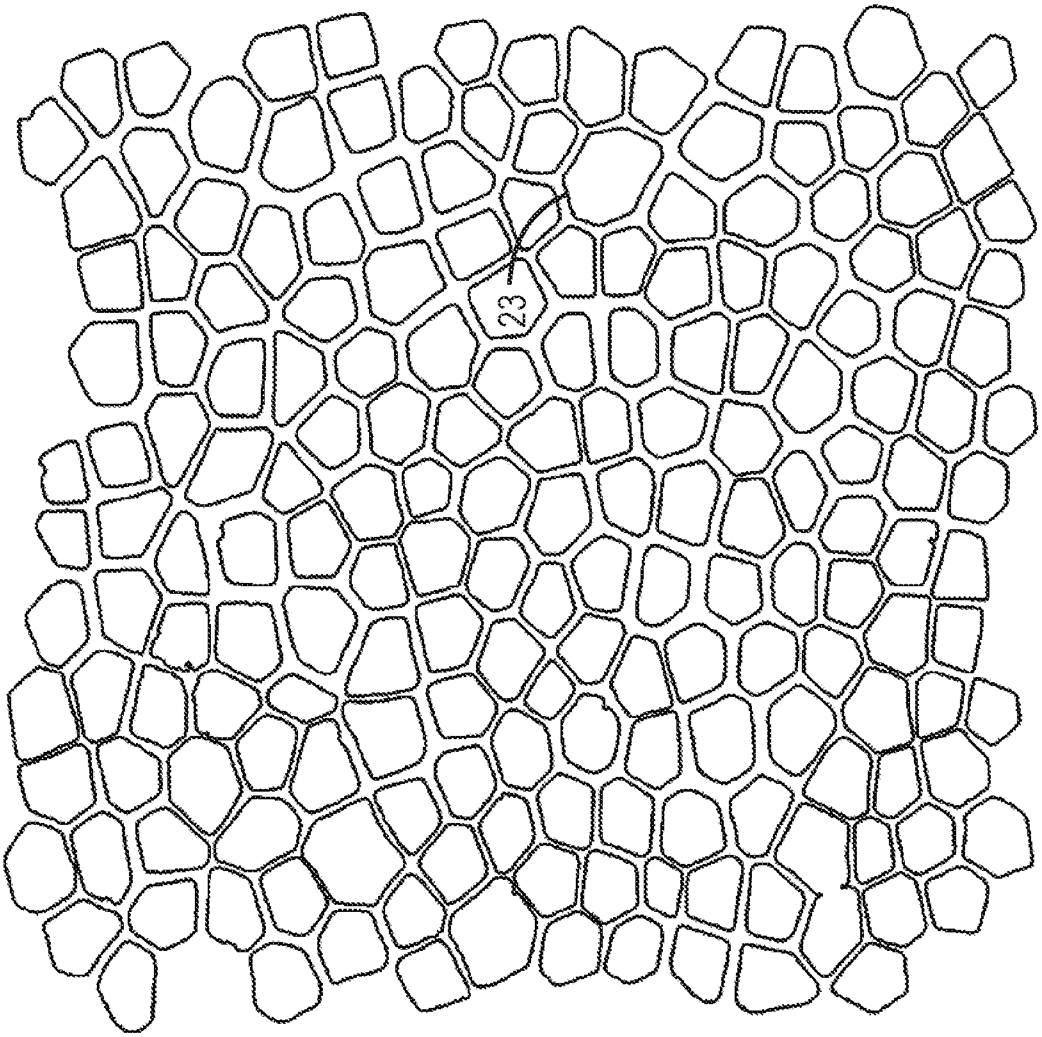
FIG. 10 illustrates perimeters of the polymeric columns of the cross-section of FIG. 9A.
Figure 11:
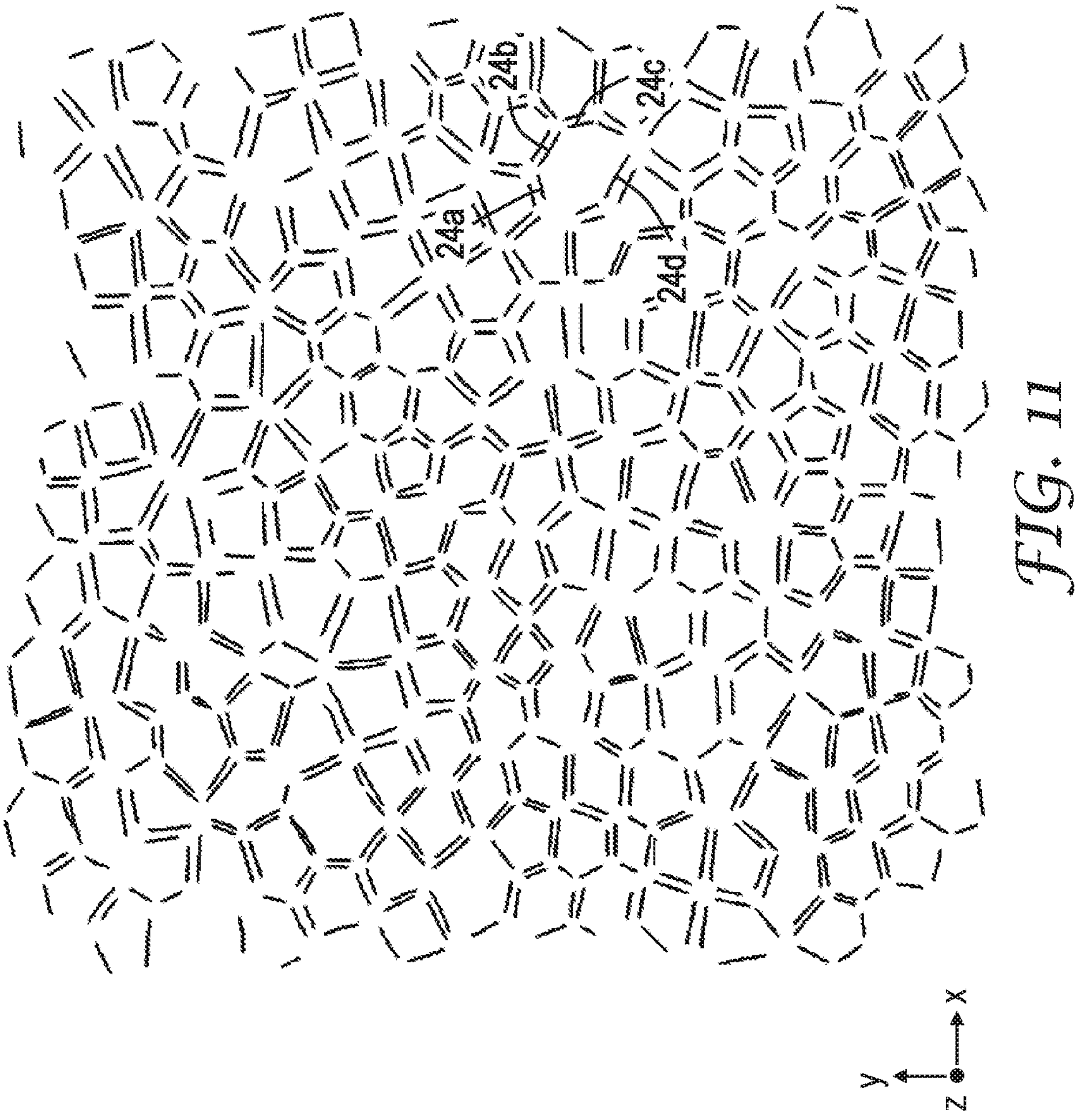
FIG. 11 illustrates straight perimeter portions of the polymeric columns of the cross-section of FIG. 9A.

FIG. 10 illustrates perimeters 23 of the polymeric columns 20 of the cross-section of FIG. 9A. FIG. 11 illustrates straight perimeter portions (e.g., 24*a*, 24*b*, 24*c*) of the polymeric columns 20 of the cross-section of FIG. 9A. FIGS. 10-11 were determined from FIG. 9A using MATLAB to determine the perimeters and the straight perimeter portions.

In some embodiments, a light control film 100 includes a plurality of substantially parallel optically transparent polymeric columns 20 disposed in, and substantially surrounded by, a light absorbing polymeric material 30. Each of the polymeric columns can have an aspect ratio of greater than about 3 or in a range described elsewhere herein. In some embodiments, in a cross-section of the light control film in a plane (xy-plane) substantially orthogonal to a thickness direction (z-direction) of the light control film, each of the polymeric columns has a closed perimeter 23. The closed perimeter of at least some of the polymeric columns may include one or more substantially straight perimeter portions 24*a*, 24*b*, 24*c*, such that a total length of the substantially straight perimeter portions is greater than about 10%, or 20%, or 30%, or 40%, or 50%, or 60%, or 70%, or 80%, or 90% of a total length of the closed perimeters of the polymeric columns in the plurality of polymeric columns in the cross-section. In some embodiments, the total length of the substantially straight perimeter portions is less than about 90%, or 80%, or 70%, or 60% of the total length of the closed perimeters of the polymeric columns in the plurality of polymeric columns in the cross-section. In some embodiments, the light control film 100 has opposing substantially planar substantially parallel first and second major surfaces 10 and 11 spaced apart along a thickness direction (z-direction) of the light control film 100. In some embodiments, the cross-section of the light control film comprises one of the first and second major surfaces 10 and 11.

Figure 12:
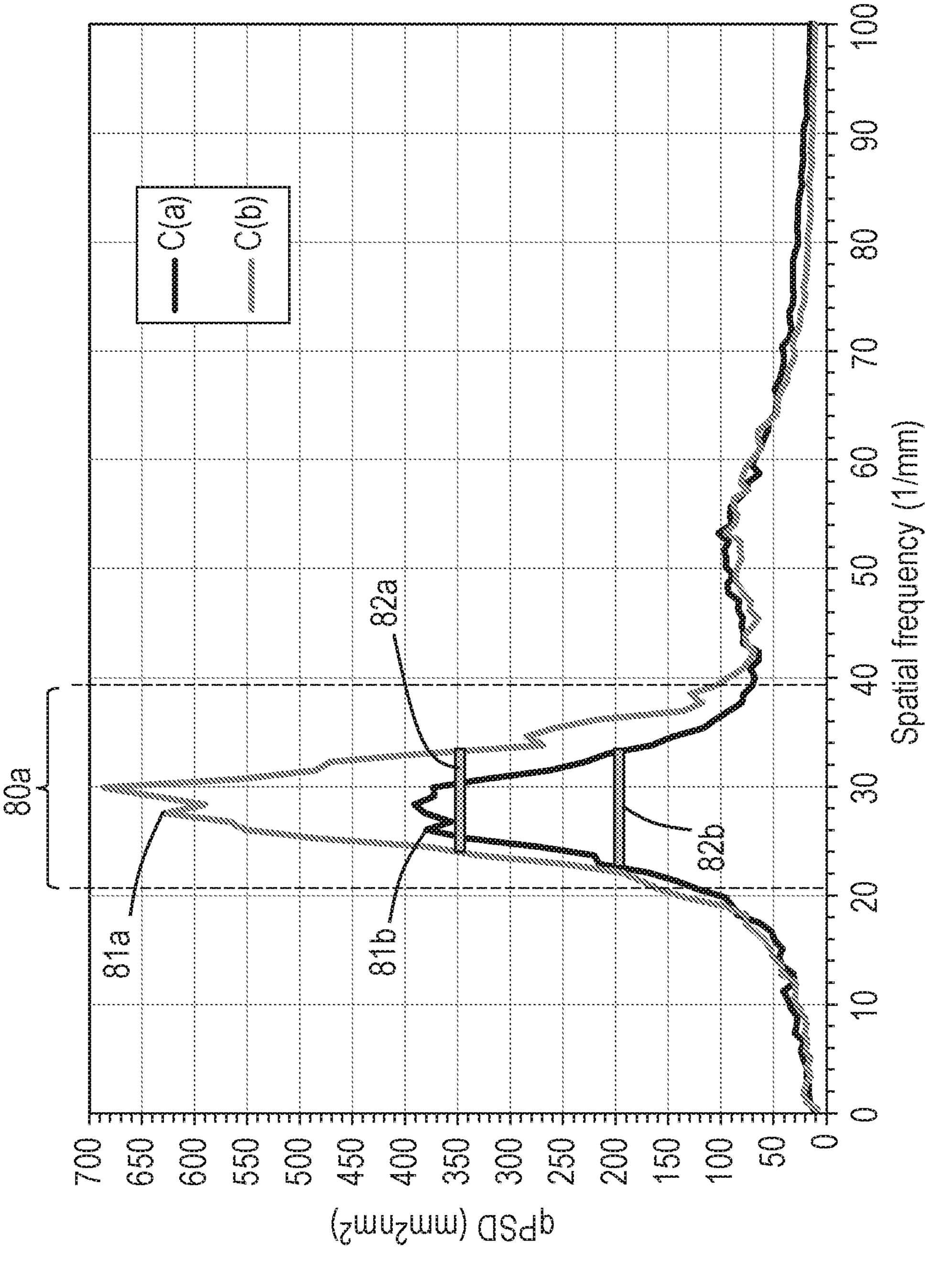
FIGS. 12-13 are plots of average radial power spectral densities of fiber core ends of light control films as a function of a spatial frequency, according to some embodiments.
Figure 13:
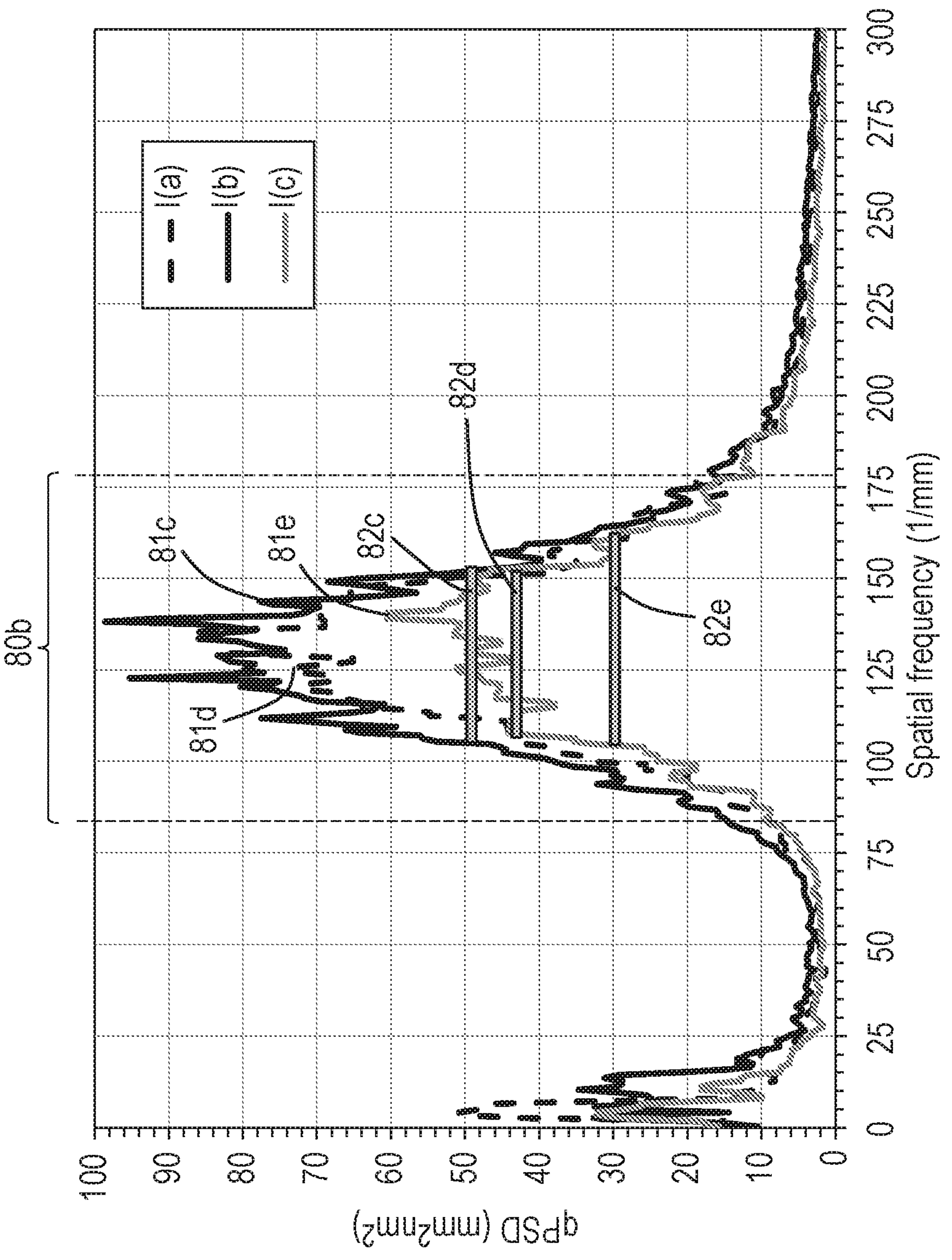
Figure 14:
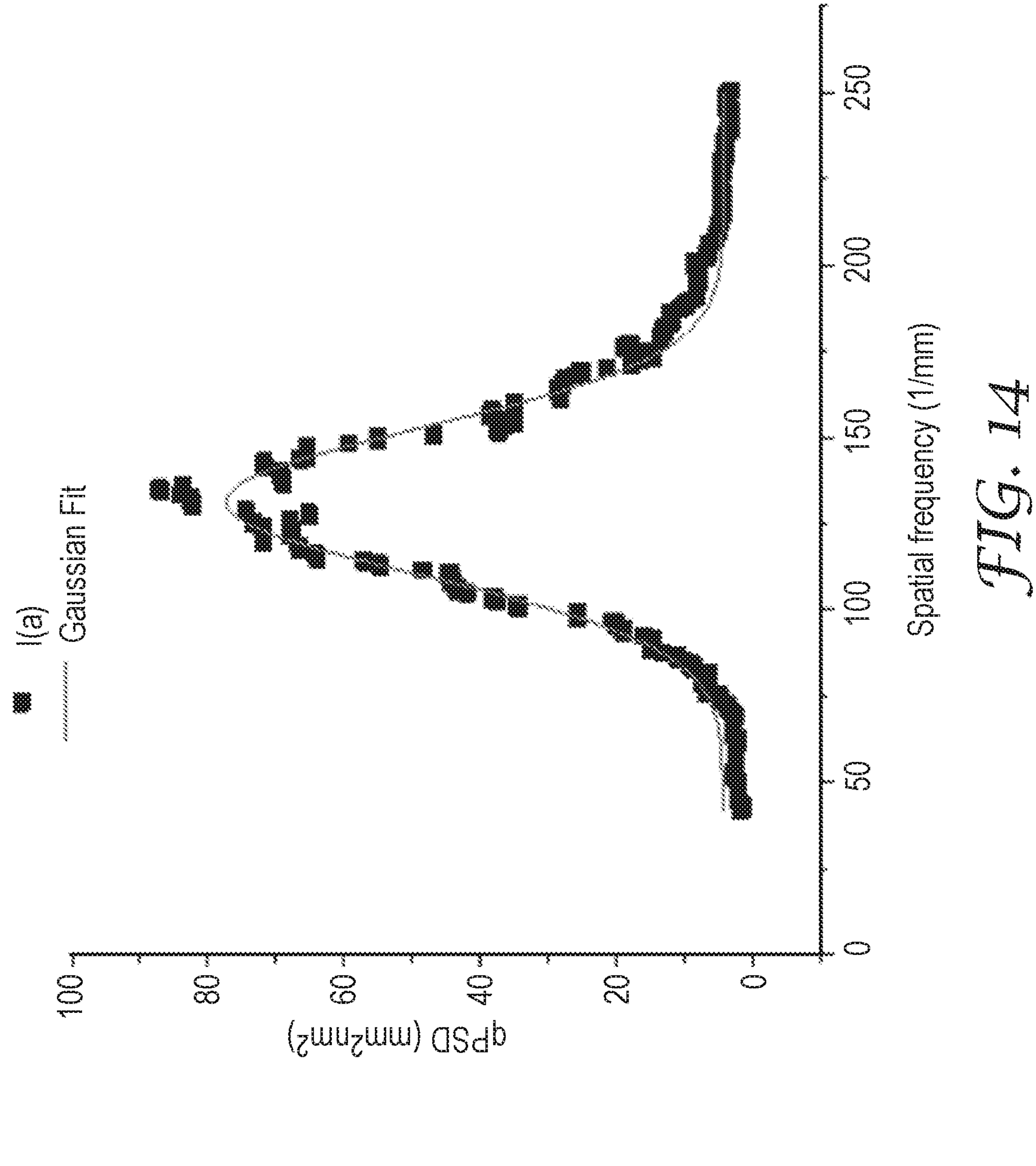
FIGS. 14-16 are plots showing Gaussian curves fitted to peak regions of the average radial power spectral densities of FIG. 13.
Figure 15:
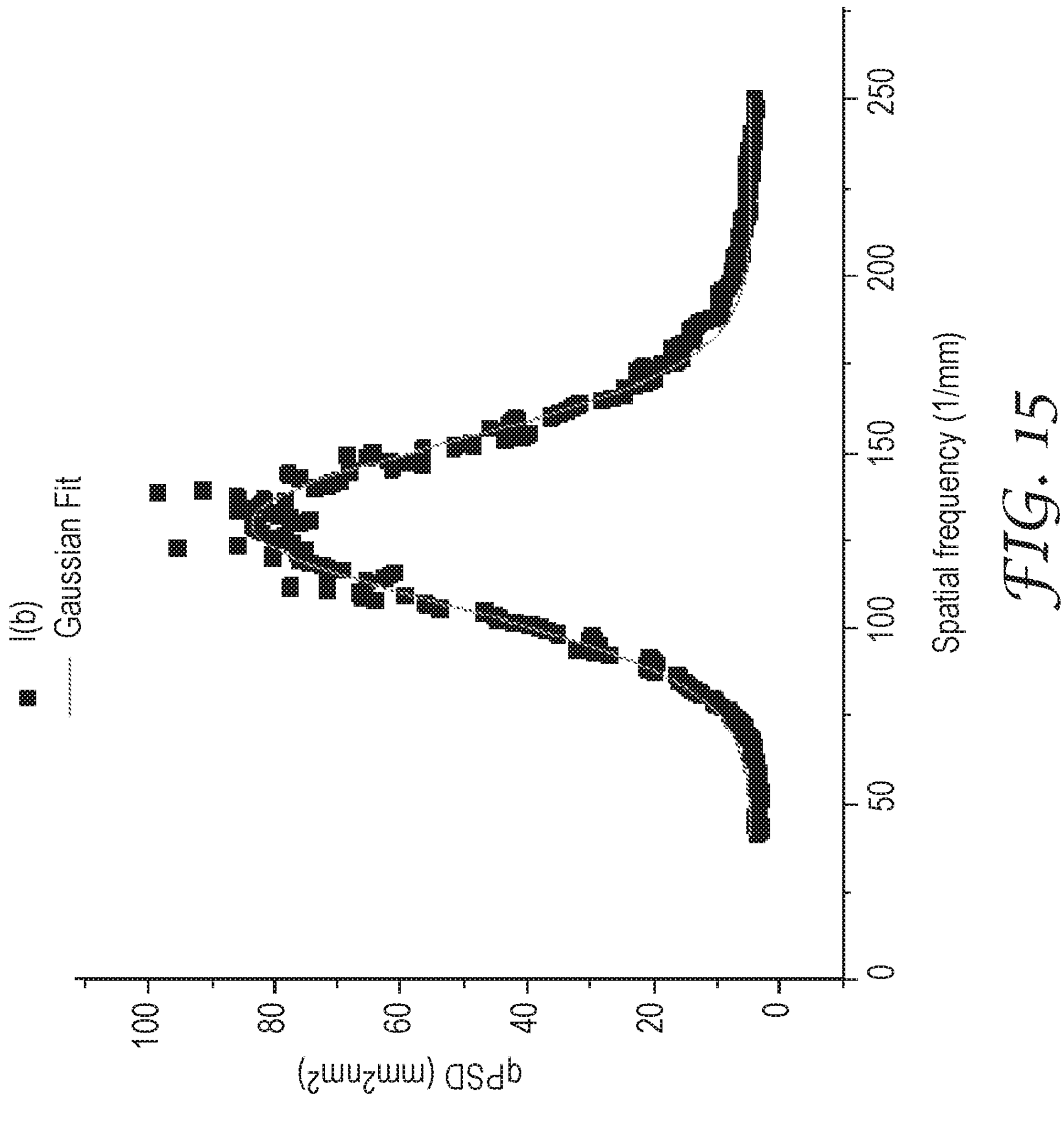
Figure 16:
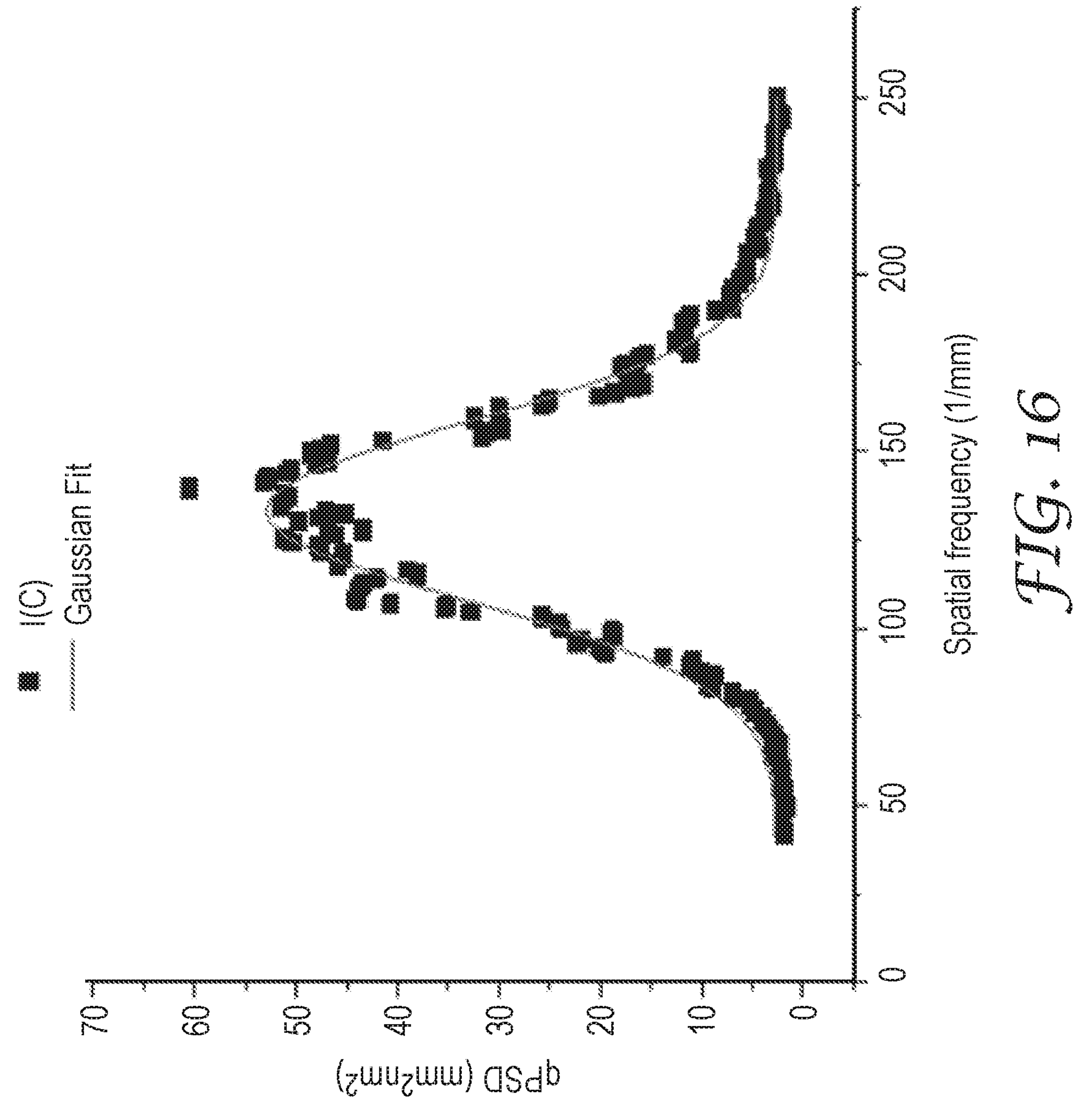
Figure 20A:
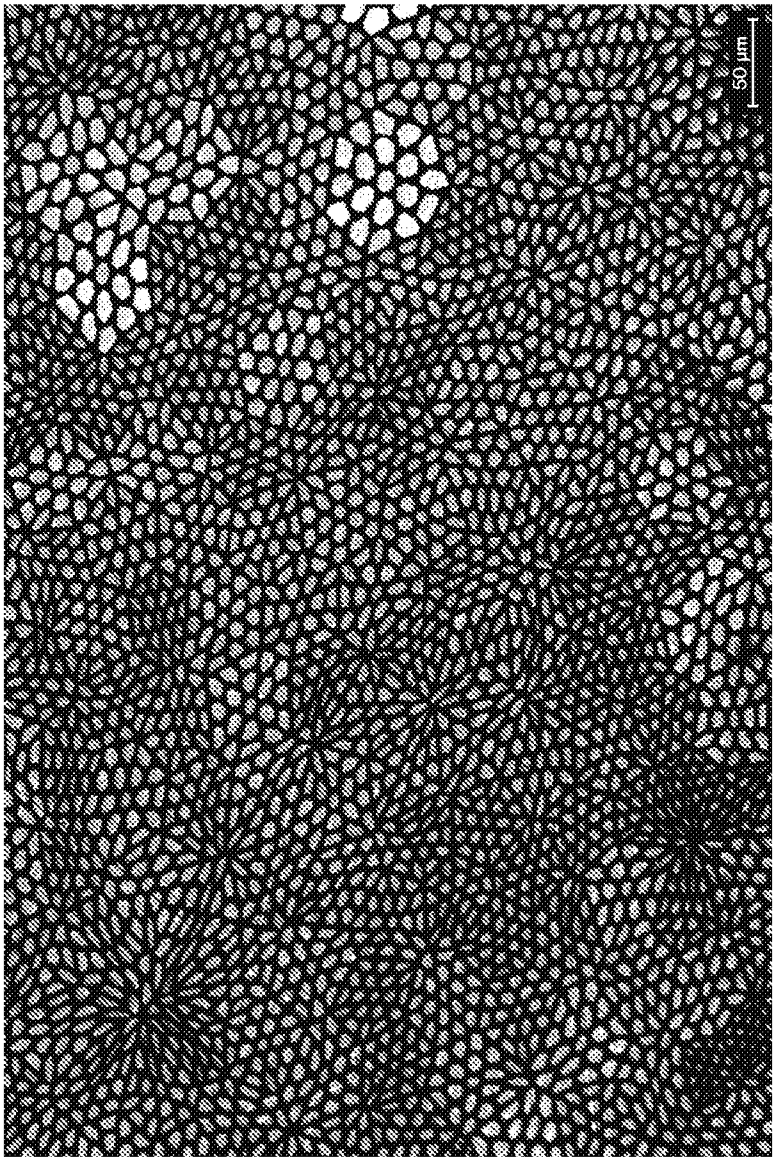
FIGS. 20A-20B are images of a top major surface of a light control film made by applying pressure and/or heat to a plurality of polymeric fibers, according to some embodiments.
Figure 20B:
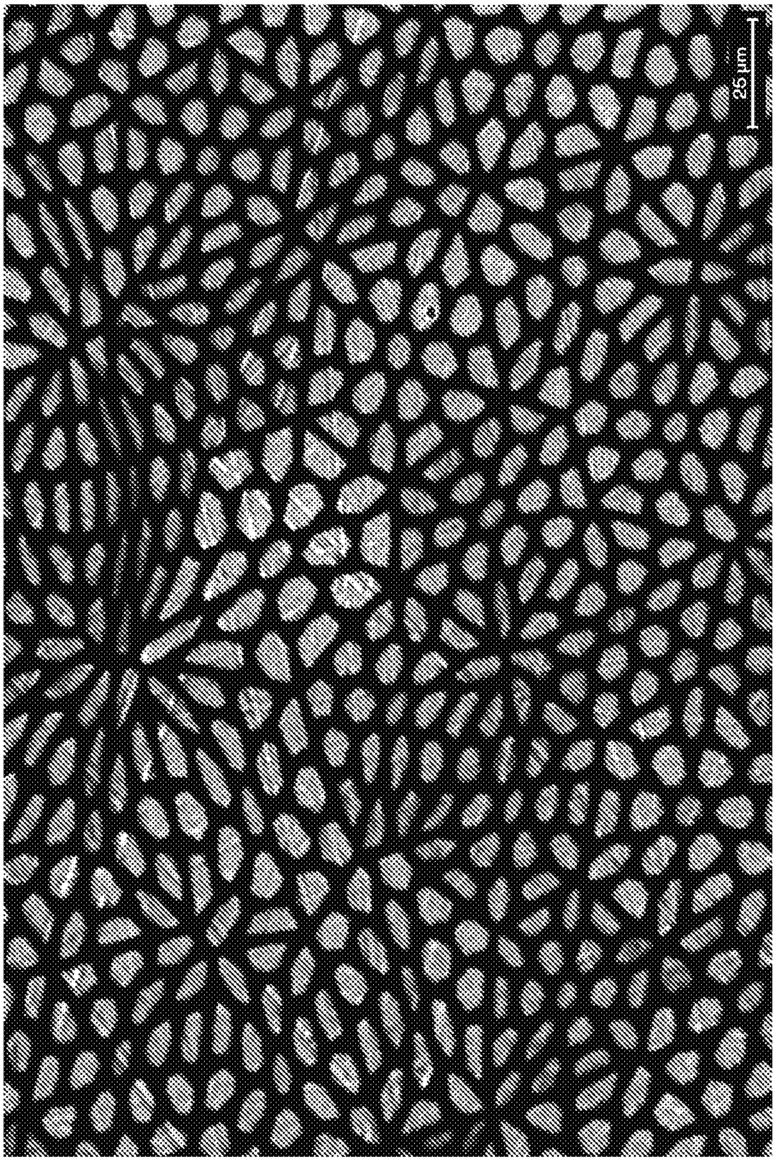
Figure 21:
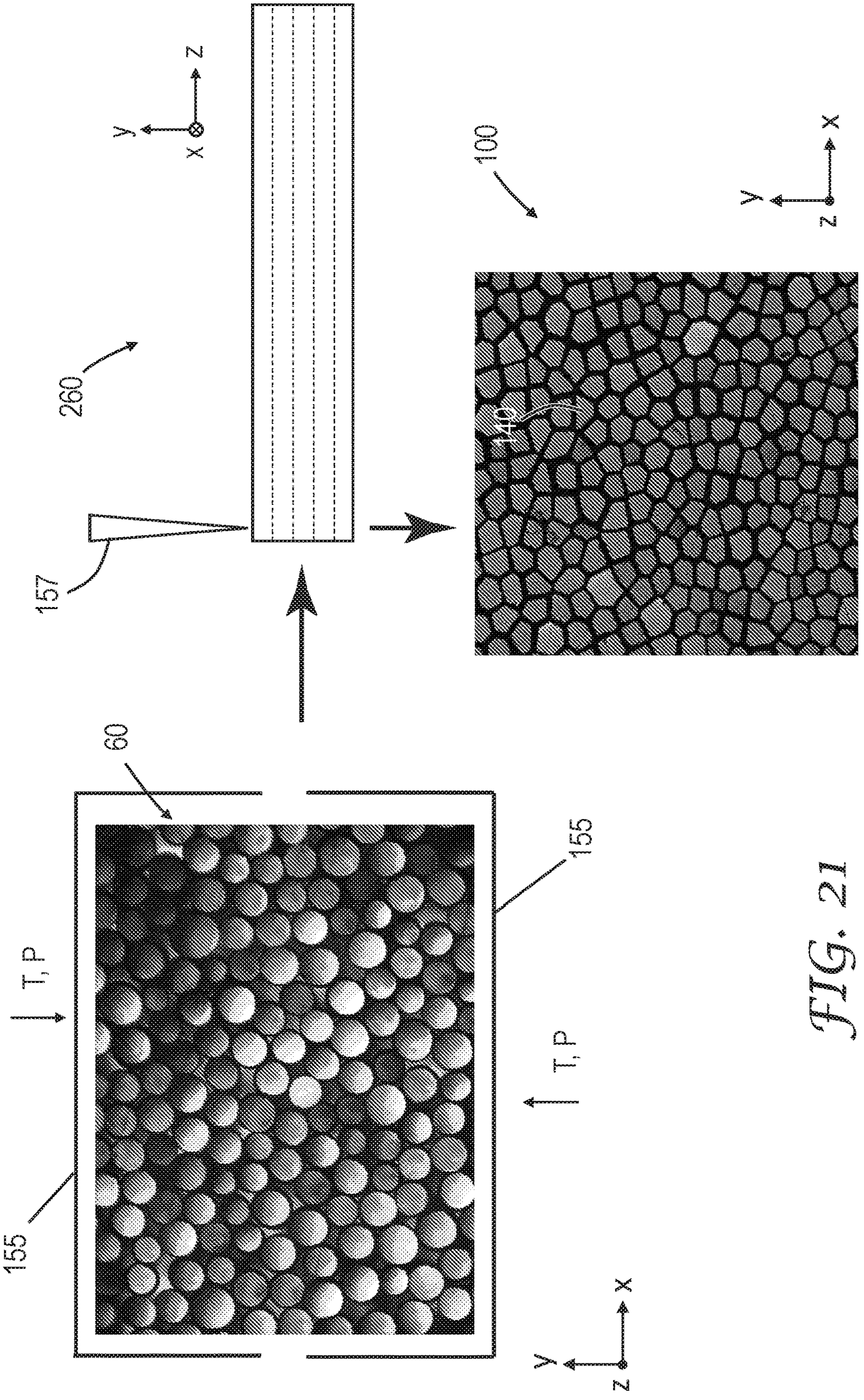
FIG. 21 is a schematic illustration of a method of fabricating a light control film, according to some embodiments.

FIG. 12 is a plot of an average radial power spectral density (qPSD) of fiber core ends as a function of a spatial frequency for light control films (labeled C(a) and C(b) in FIG. 12) formed via cutting a fused block of core-sheath fibers (see, e.g., FIGS. 17 and 21). FIG. 13 is a plot of an average radial power spectrum density of fiber core ends as a function of a spatial frequency for light control films (labeled I(a), I(b) and I(c) in FIG. 13) formed via cutting a fused block of island-in-the-sea fibers (see, e.g., FIGS. 19, 20A-20B, and 21). FIGS. 14-16 are plots showing Gaussian curves fitted to peak region of the qPSDs of FIG. 13 for the samples labeled I(a), I(b) and I(c), respectively. The qPSDs were determined by taking a magnitude squared of a Fourier transform of the grey scale values of an image of the major surface of the light control film containing the fiber core ends to produce a power spectral density (PSD) and then averaging the PSD over azimuthal angle to produce the average radial PSD. Since the light absorbing material appears black and therefore has a gray scale value of zero or approximately zero, the qPSD of the major surface may be described as a qPSD of the fiber core ends. The qPSD may be determined over a sufficiently large area that increasing the area does not substantially change the qPSD. The area can be a square area having a width of at least 400 microns, for example. A Hamming window, for example, can be applied to the image to suppress any ringing artifacts arising from the boundary of the image, as is known in the art.

In some embodiments, a light control film 100 includes a plurality of optically transparent spaced apart polymeric fiber cores 20 substantially surrounded by a common light absorbing polymeric cladding 30. The fiber cores 20 include corresponding fiber core ends (e.g., 21) seemingly irregularly arranged at a major surface (e.g., 10) of the light control film, such that an average radial power spectral density of the fiber core ends as a function of a spatial frequency in a cross-section of the light control film in a plane (xy-plane) substantially orthogonal to a thickness direction (z-axis) of the light control film includes a first peak region (80*a*-80*b*) including one or more local peaks (81*a*-81*e*) and defined by a full width at half maximum (FWHM) (82*a*-82*e*) of between about 5 and about 150 inverse mm, or between about 5 and about 125 inverse mm, or between about 5 and about 100 inverse mm, or between about 7 and about 100 inverse mm, or between about 10 and about 100 inverse mm. The first peak region can be defined by the FWHM as being a region including the FWHM and extending on each side of the FWHM by 0 to 1 (e.g., 0, 0.5, or 1) times the FWHM, for example. In some embodiments, the first peak region is substantially centered on the FWHM and has a width of 1 to about 2 (e.g., 1, 1.5, or 2) times the FWHM. In some embodiments, the plane (xy-plane) substantially orthogonal to the thickness direction of the light control film is the major surface (e.g., 10) of the light control film 100. In some embodiments, a FWHM of a Gaussian curve fitted to the first peak region is between about 10 and about 150 inverse mm, or between about 20 and about 125 inverse mm, or between about 20 and about 100 inverse mm, or between about 30 and about 100 inverse mm, or between about 40 and about 90 inverse mm.

Figure 17A:
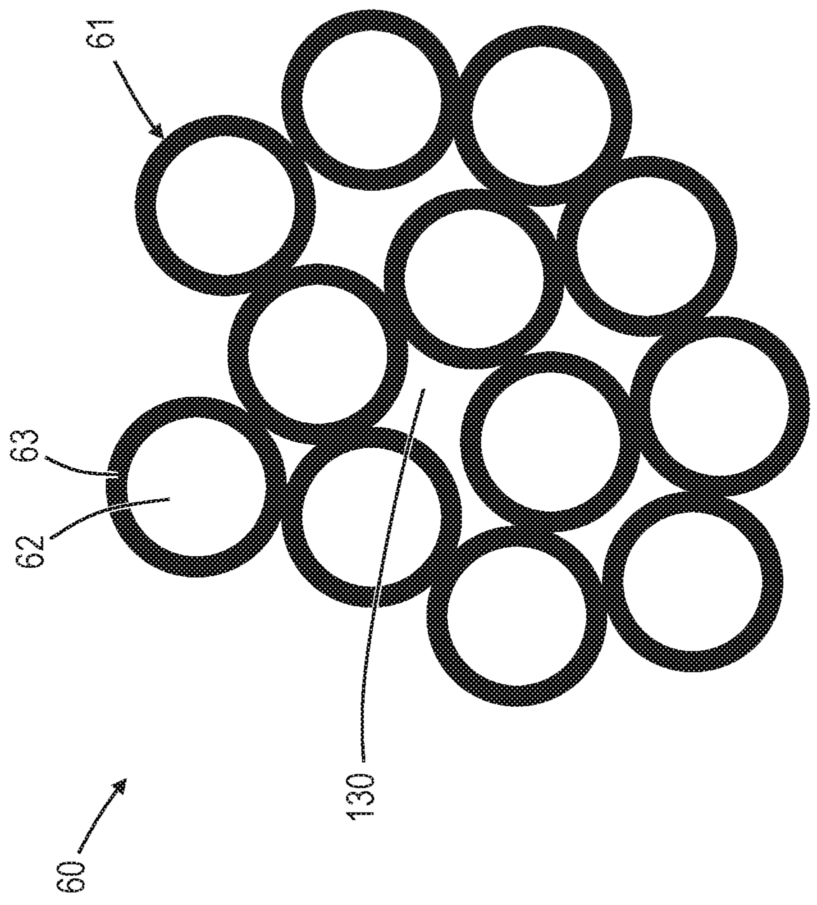
FIG. 17A is a schematic end view of a plurality of polymeric fibers, according to some embodiments.
Figure 17B:
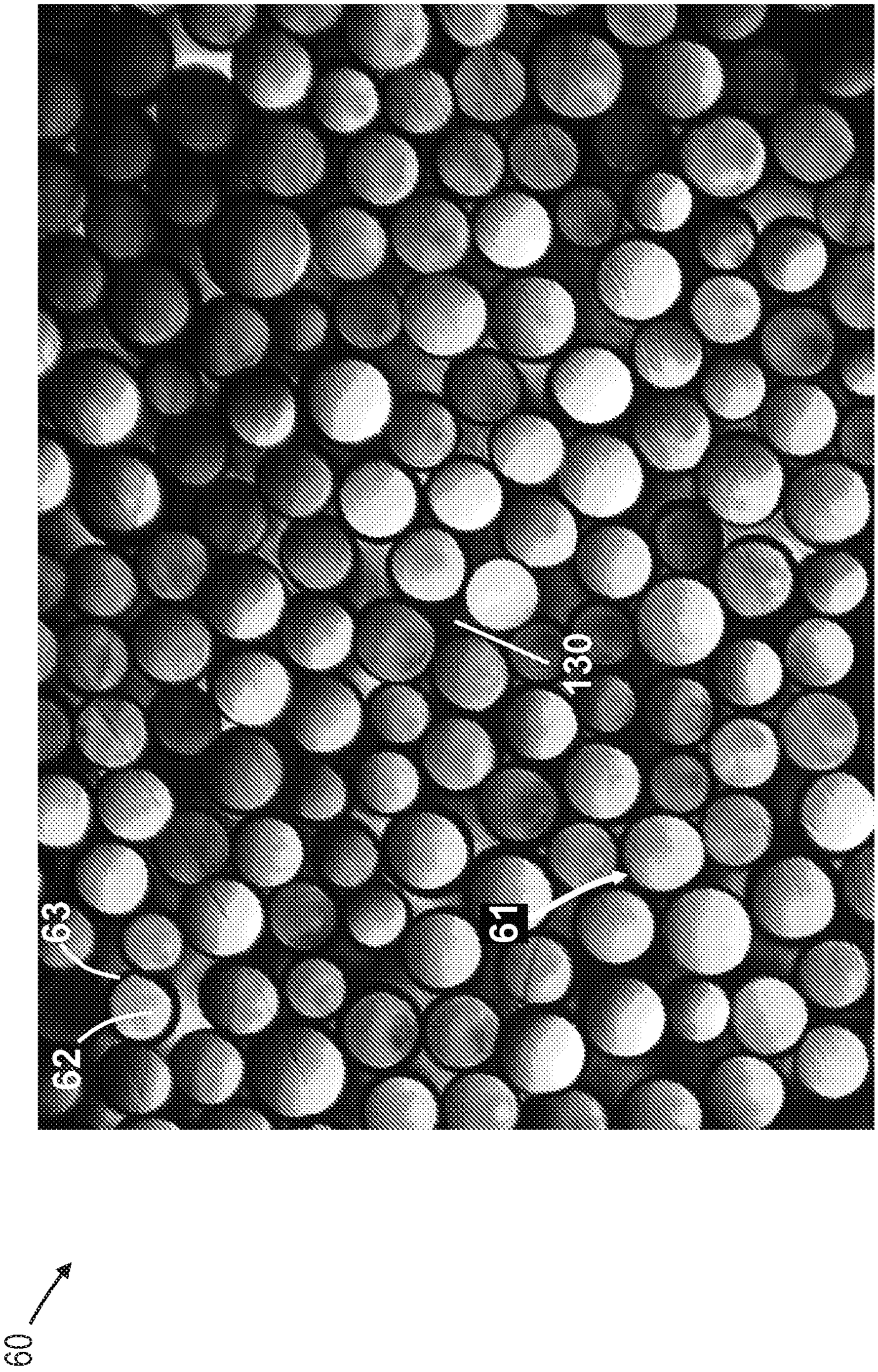
FIG. 17B is an end view image of a plurality of polymeric fibers, according to some embodiments.
Figure 18:
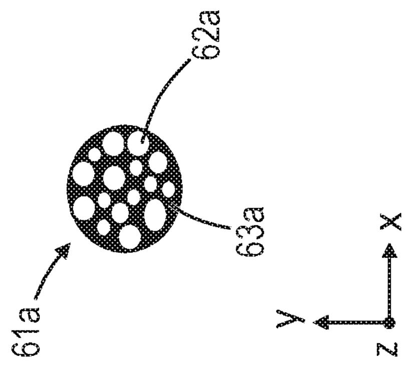
FIG. 18 is a schematic cross-sectional view of a fiber, according to some embodiments.

FIG. 17A is a schematic end view of a plurality 60 of polymeric fibers 61, according to some embodiments. FIG. 17B is an end view image of a plurality 60 of polymeric fibers 61, according to some embodiments. FIG. 18 is a schematic cross-sectional view of a fiber 61*a*, according to some embodiments. The fibers illustrated in FIGS. 17A-17B may be referred to as core-sheath fibers and/or bicomponent fibers, and the fiber 61*a* of FIG. 18 may be referred to as an island-in-the-sea fiber and may be a bicomponent fiber or a multi-component fiber. An advantage of using island-in-sea fibers, according to some embodiments, is that such fibers may provide smaller column diameters (e.g., d1 less than about 10 microns) so that the resulting light control films provide better image resolution when used in a finger sensing display, for example.

Bicomponent fibers, multi-component fibers, core-sheath fibers and island-in-the-sea fibers can be made by fiber melt-spinning, for example, which may be described as a form of extrusion where a spinneret is used to form continuous filaments. Such fibers are generally known in the art and are described in U.S. Pat. Appl. Pub. No. 2015/0125504 (Ward et al.), for example, and in U.S. Pat. No. 5,702,658 (Pellegrin et al.); U.S. Pat. No. 6,465,094 (Dugan); U.S. Pat. No. 7,622,188 (Kamiyama et al.), for example. In some embodiments, the plurality 60 of fibers may include core-sheath fibers, island-in-the-sea fibers, or a combination thereof. In some embodiments, a plurality 60 of polymeric fibers (61, 61*a*) extend substantially along a same first direction (z-direction), where each of the polymeric fibers include one or more polymeric cores (62, 62*a*) surrounded by, and coextruded and substantially coextensive in length with, a polymeric cladding (63, 63*a*), such that the polymeric cladding has a thickness smaller than a maximum lateral dimension (xy-plane) of the polymeric core, such that along the first direction, the polymeric cores are substantially more optically transparent than the polymeric claddings at at least one same visible wavelength in a visible wavelength range extending from about 420 nm to about 680 nm. For example, the polymeric cores can correspond to substantially optically transparent columns 20, the polymeric claddings can correspond to light absorbing polymeric material 30, and the at least one same visible wavelength can correspond to the wavelength k depicted in FIG. 4. In some embodiments, each of the polymeric fibers 61*a*, or each polymeric fiber in at least a majority of the polymeric fibers, includes a plurality of polymeric cores 62*a* surrounded by, and coextruded and substantially coextensive in length with, a polymeric cladding 63*a*. In some embodiments, each polymeric core 62*a* is coextensive with at least 80% or at least 90% or at least 95% of a length of each other polymeric core 62*a* and with a length of the polymeric cladding 63*a*. In some embodiments, each of the polymeric fibers 61, or each polymeric fiber in at least a majority of the polymeric fibers, includes a single core 62 substantially concentric with the polymeric cladding 63. In some embodiments, each single core 62 is coextensive with at least 80% or at least 90% or at least 95% of a length of the polymeric cladding 63.

Figure 19:
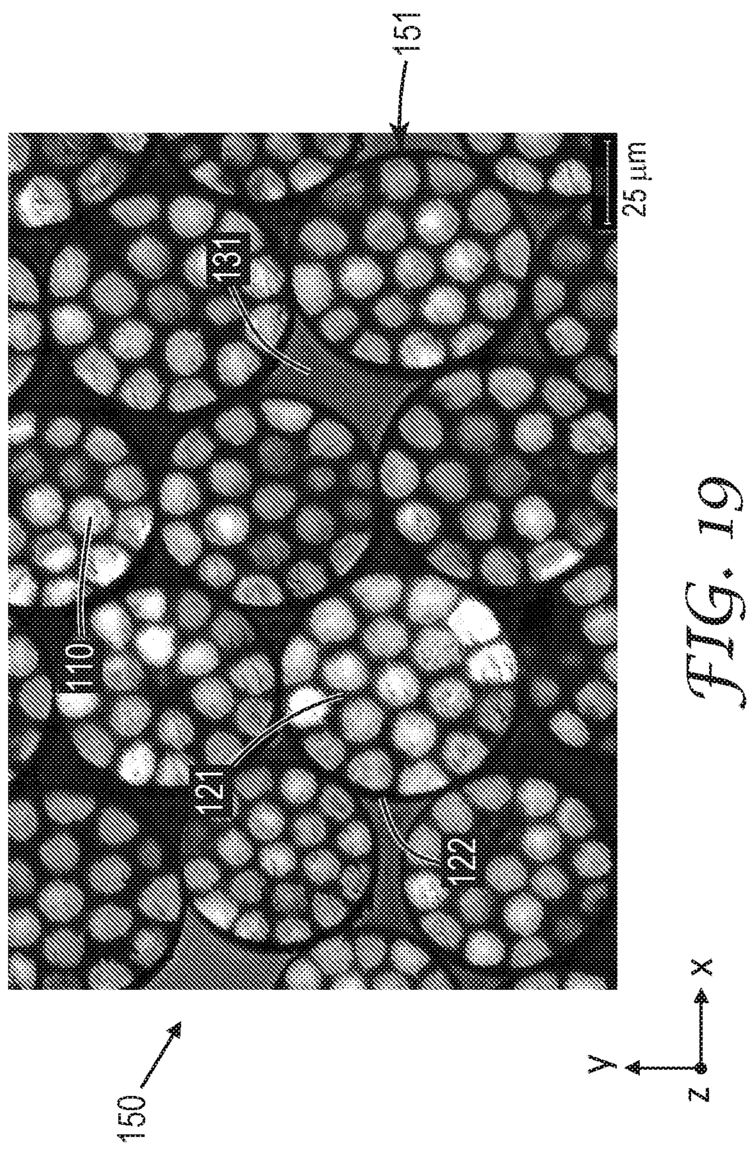
FIG. 19 is an end view image of a plurality of polymeric fibers where each fiber includes a plurality of polymeric cores, according to some embodiments.

FIG. 19 is an end view image of a plurality 150 of polymeric fibers 151, according to some embodiments. Each fiber 151 includes a plurality of polymeric cores 110 substantially surrounded by light absorbing material 121, 122. FIGS. 20A-20B are images of a top major surface of a light control film made by applying pressure and/or heat to a plurality of polymeric fibers similar to that of FIG. 19. FIG. 20B is at a higher resolution than FIG. 20A.

FIG. 21 is a schematic illustration of a method of fabricating a light control film 100, according to some embodiments. The plurality 60 of fibers 61 are schematically shown in a mold 155. Alternatively, the plurality 150 of fibers 151 may be used to result in a light control film as shown in FIGS. 20A-20B, for example. In some embodiments, the method includes providing a plurality of substantially parallel optically transparent first polymeric columns (e.g., 60, 62*a*, or 110) extending along a same first direction (z-axis) and disposed in, and substantially surrounded by, a light absorbing polymeric material (e.g., 63, 63*a* or 121, 122), the first polymeric columns defining a plurality of substantially optically transparent gaps (e.g., 130, 131) therebetween; and applying at least one of pressure (P) and heat (temperature T) to the plurality of first polymeric columns along at least one second direction (x- and/or y-direction) substantially orthogonal to the first direction. Each of the first polymeric columns has a lateral cross-sectional first shape. The at least one of pressure and heat at least reduces a size of at least some of the gaps and modifying each of the first polymeric columns to a corresponding second polymeric column (e.g., 140) having a lateral cross-sectional second shape different than the cross-sectional first shape of the first polymeric column. In some embodiments, the first shape is circular. In some such embodiment, or in other embodiments, the second shape is a polygon.

In some embodiments, the plurality of substantially parallel optically transparent first polymeric columns is provided by making a plurality of polymeric fibers by melt-spinning. In some embodiments, the melt-spinning process includes feeding resin pellets into extruders such that molten polymers are combined in a spin pack and exit from a spinneret. The fibers may then be pulled down by godets while optionally being quenched and spin finished. A fiber tow can then be collected by a winder. A bundle of the fibers can be formed by unwinding one or more fiber tows and feeding the fibers into a rewind system which can lay down the fibers substantially parallel with each other under tension in a mold or in a plurality of molds (e.g., the rewind system can include a wheel where the molds are mounted around the wheel).

In some embodiments, the plurality of substantially parallel optically transparent first polymeric columns 110 includes a plurality of discrete individual groups 151 of first polymeric columns. Each of the discrete individual groups includes a number (e.g., 2 to 40, or 4 to 30, or 6 to 25) of the first polymeric columns; and a light absorbing material 121 filling spaces between the first polymeric columns and providing a light absorbing periphery 122 surrounding the first polymeric columns 110. In some embodiments, the discrete individual groups of the first polymeric columns define the plurality of substantially optically transparent gaps 131 therebetween. In some embodiments, each of the first polymeric columns 62 is surrounded by a corresponding a light absorbing polymeric layer 63 including a light absorbing material, where the light absorbing layer is substantially concentric with the first polymeric column. For example, in a cross-section orthogonal to the length direction of the columns 62, a centroid of the light absorbing material can be approximately coincident (e.g., coincident to withing about 20% or about 10% of a diameter of the corresponding column 62) with a centroid of the corresponding column 62. In some embodiments, the light absorbing polymeric layers define the plurality of substantially optically transparent gaps 130 therebetween.

In some embodiments, applying the at least one of pressure and heat to the plurality of first polymeric columns includes disposing the first polymeric columns in a mold 155 and applying the at least one of pressure and heat to the mold. In some embodiments, applying the heat includes heating the first polymeric columns at a temperature of at least 100, or 110, or 120, or 130 deg C. for at least 2 hours. The temperature is preferably less than each of the thermal decomposition temperatures of the polymeric columns and the light absorbing material. In some embodiments, the heating is for at least 4, or 6, or 8, or 10 hours and may be for up to 48 or 24 hours, for example. In some embodiments, applying the pressure includes applying a pressure of at least 10, or 20, or 30, or 40, or 50 psi to the first polymeric columns for at least 2 hours. The pressure may be up to 500 psi or up to 200 psi, for example. In some embodiments, the pressure is applied for at least 4, or 6, or 8, or 10 hours and may be applied for up to 48 or 24 hours, for example. A hot press or an autoclave, for example, may be used to apply the heat and/or pressure.

In some embodiments, applying the at least one of pressure and heat results in the light absorbing polymeric material bonding the second polymeric columns to one another to form an integral block 260 of the second polymeric columns. In some embodiments, the method further includes cutting (e.g., using blade 157) the integral block of the second polymeric columns. For example, the light control film 100 may be cut from the integral block 260. The cutting can be carried out after the integral block has been removed from the mold 155 and allowed to cool down. The cutting may include one or more of skiving, dicing, sawing, and laser cutting, for example.

EXAMPLES

These examples are merely for illustrative purposes only and are not meant to be limiting on the scope of the appended claims. All parts, percentages, ratios, etc. in the examples and the rest of the specification are by weight, unless noted otherwise.

Example 1

Cellulose acetate butyrate (CAB) resins were used to make core sheath fibers. The core resin was TENITE Butyrate 575E3720010 from Eastman Chemical Company (Kingsport, TN) which included 10% plasticizer. The sheath resin was a 90:10 blend of TENITE Butyrate 575E3720010 and TENITE Butyrate 200AZ107910, both from Eastman Chemical Company. The blend included 10% plasticizer and 2% carbon black. The specifications for the fiber spinning system used to make the fibers are given in Table 1 while fiber spinning process conditions are given in Table 2. Fibers were collected to 6-inch diameter plastic cores. Target fiber diameter was around 30 microns.

TABLE 1

Fiber spinning system setup for Example 1

| Die Type | Number of holes | Hole size | Pump size | Extruder type | Extruder screw diameter | Winder type |
|---|---|---|---|---|---|---|
| Core sheath | 165 | 350 microns | 2.92 cc/rev | Single screw | ⅝ inch | Cross winder |

TABLE 2

Fiber spinning process conditions for Example 1

| Extruder zone 1 | Extruder zone 2 | Extruder zone 3 | Transfer Pipe | Die | Core pump rate | Sheath pump rate | Winder speed |
|---|---|---|---|---|---|---|---|
| 190° C. | 210° C. | 215-230° C. | 215-230° C. | 215-230° C. | 2-4 rpm | 2-4 rpm | 50-100 mpm |

Fibers on the cores were then unwound and rewound on a wheel on which eight metal molds were mounted at a speed around 20 mpm (meters per minute). Each mold was filled with fibers laid down parallelly to form 1 by 1-inch bundle. A cap was screwed on to the mold after the rewinding to keep the fiber bundle in place.

The mold was placed in an autoclave chamber. The block forming steps were as follows:

1. Set autoclave pressure to 75 Psi
2. Raise temperature to 120° C. over 3.5 hours
3. Hold for 2 hours
4. Decrease temperature to 25° C.
5. Release pressure and turn autoclave off The fused block was removed from the mold and skived/cut to films for measurement. Some films were polished further to increase the surface quality. The average radial power spectral densities of fiber core ends of light control films as a function of a spatial frequency of two film samples were determined and are shown in FIG. 12.

Example 2

Cellulose acetate butyrate (CAB) resins were used to make island-in-the-sea fibers. The island resin was TENITE Butyrate 575E3720010 from Eastman Chemical Company (Kingsport, TN) which included 10% plasticizer. The sea resin was a 90:10 blend of TENITE Butyrate 285A3720016 (which included 16% plasticizer) and TENITE Butyrate 200AZ107910 (which included 10% plasticizer). The blend included 2% carbon black. The specifications for the fiber spinning system used to make the fibers are given in Table 3 while fiber spinning process conditions are given in Table 4. Fibers were collected to 6-inch diameter plastic cores. The target fiber diameter was around 50 microns and each island in the fiber was around 10 microns, which was smaller than the cores in Example 1.

TABLE 3

Fiber spinning system setup for Example 2

| Die Type | Number of holes | Hole size | Pump size | Extruder type | Extruder screw diameter | Winder type |
|---|---|---|---|---|---|---|
| Island-in-the-sea | 156 | 0.02 inch | 2.92 cc/rev | Single screw | ⅝ inch | Cross winder |

TABLE 4

| Fiber spinning process conditions for Example 2 | | | | | | | |
|---|---|---|---|---|---|---|---|
| Extruder zone 1 | Extruder zone 2 | Extruder zone 3 | Transfer Pipe | Die | Island pump rate | Sea pump rate | Winder speed |
| 190° C. | 210° C. | 230° C. | 230° C. | 230° C. | 4 rpm | 4 rpm | 75 mpm |

The fibers were rewound to molds using the method described in Example 1 and the fusing conditions were similar, except that the temperature in step 2 was 120° C. for some samples and 130° C. for some other samples. The average radial power spectral densities of fiber core ends of light control films as a function of a spatial frequency of three films samples were determined and are shown in FIG. 13. Gaussian fit results are shown in FIGS. 14, 15 and 16.

Example 3

Example 3 was made similarly to Example 1, but modifications were made to increase the transmission compared to Example 1. The core sheath resin rate ratio was increased from 1:1 and 2:1 to 3:1; and the carbon loading in the sheath was increased from 2% to 6% by changing the resin used for the sheath to a 70:30 blend of TENITE Butyrate 575E3720010 and TENITE Butyrate 200AZ107910. The fused block was skived with a precision carbide knife and an infrared (IR) heating lamp. Transmission spectra of films of different thickness were measured and are shown in FIG. 7. FIG. 8 and FIGS. 9A-9B are cross-sectional images of film samples with different surface roughness and features. FIG. 10 illustrates perimeters of the polymeric columns of a film cross-section image while FIG. 11 illustrates straight perimeter portions of the polymeric columns of the same image.

Example 4

Example 4 was made similarly to Example 2, but modifications were made to increase the transmission compared to Example 2. The island sea resin rate ratio was increased from 1:1 to 3:1; and the carbon loading in the sheath was increased from 2% to 6% by changing the resin used for the sea to a 70:30 blend of TENITE Butyrate 575E3720010 and TENITE Butyrate 200AZ107910. FIGS. 20A and 20B are cross sectional images of the film samples.

Images of samples from Example 3 and 4 were characterized using MATLAB image analysis software (available from MATHWORKS, Natick, MA). Flat regions of the perimeter were identified by calculating the 3-point curvature (Menger curvature) at each point on the perimeter in the image, defining a relative curvature by multiplying the curvature by half of the largest diameter of the fiber area, and identifying points as being along a substantially flat side when the relative curvature was less than ⅓. Results are reported in Table 5 where: percent flat is the average percentage of perimeters that consist of flat sides; percent parallel is the average percentage of perimeters that consist of flat sides that are substantially parallel to an adjacent flat side; relative side length is the length of flat sides divided by the perimeter length times 100%; and acute angle is the acute angle between the substantially parallel lines. Table 5 compares samples from Example 3 and 4 with a simulated cross section image. The simulated image mimics a film having all elliptical columns. The "percent flat mean" and "percent parallel mean" of samples from Example 3 and 4 images were much higher than those from the simulated image.

TABLE 5

| Sample ID | number of perimeters | percent flat mean | percent parallel mean | relative side length (%) mean | acute angle (°) mean |
|---|---|---|---|---|---|
| Core sheath Example 3 | 189 | 56.3 | 46.1 | 15.8 | 2.9 |
| Island sea Example 4 | 261 | 42.2 | 15.5 | 14.6 | 21.5 |
| Simulated ellipses | 259 | 5.9 | 0.7 | 15.1 | 8.8 |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially" with reference to a property or characteristic is not otherwise clear to one of ordinary skill in the art in the context in which it is used and described in the present description and when it would be clear to one of ordinary skill in the art what is meant by an opposite of that property or characteristic, the term "substantially" will be understood to mean that the property or characteristic is exhibited to a greater extent than the opposite of that property or characteristic is exhibited.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A light control film comprising:

opposing substantially planar substantially parallel first and second major surfaces spaced apart along a thickness direction of the light control film by less than about 500 microns; and a plurality of substantially parallel optically transparent polymeric columns disposed in, and substantially surrounded by, a light absorbing polymeric material, each of the polymeric columns comprising a polymeric fiber core and having a first column end at the first major surface and an opposite second column end at the second major surface, each of the polymeric columns having an aspect ratio of greater than about 3, such that the first column ends of at least one pair of adjacent polymeric columns comprise substantially parallel substantially straight sides facing, and substantially coextensive with, each other, wherein the first column ends define a plurality of different irregular polygonal shapes.

2. The light control film of claim 1, wherein the substantially parallel substantially straight sides form an angle of less than about 15 degrees with one another.

3. The light control film of claim 1, wherein in at least one cross-section of the light control film in a plane substantially orthogonal to the thickness direction, the polymeric columns generally extend along a first direction making an angle of between about 2 degrees and about 60 degrees with the thickness direction.

4. The light control film of claim 1, wherein the first column ends cover at least 40% of the first major surface.

5. The light control film of claim 1, wherein the plurality of optically transparent polymeric columns comprises a plurality of polygonal first column ends at the first major surface of the light control film and a plurality of polygonal second column ends at the second major surface of the light control film.

6. The light control film of claim 5, wherein at least two of the column ends of at least one of the polygonal first column ends and the polygonal second column ends have a different number of sides.

7. The light control film of claim 1, wherein in a cross-section of the light control film in a plane substantially orthogonal to the thickness direction of the light control film, each of the polymeric columns comprises a closed perimeter, the closed perimeter of at least some of the polymeric columns comprising one or more substantially straight perimeter portions, such that a total length of the substantially straight perimeter portions is greater than about 10% of a total length of the closed perimeters of the polymeric columns in the plurality of polymeric columns in the cross-section.

8. The light control film of claim 1, wherein in a cross-section of the light control film in a plane substantially orthogonal to the thickness direction of the light control film, each of the polymeric columns comprises one or more sides, such that for each pair in a plurality of pairs of adjacent polymeric columns, a side of one of the adjacent polymeric columns faces, and is substantially parallel and coextensive in length with, a side of the other one of the polymeric columns to form a pair of parallel sides, such that a total number of the sides of the polymeric columns that are part of a pair of parallel sides is greater than about 10% of a total number of sides in the plurality of polymeric columns in the cross-section.

9. The light control film of claim 1 being formed by cutting, at least once, a block that comprises a plurality of substantially parallel optically transparent polymeric columns disposed in, and substantially surrounded by, a light absorbing polymeric material, the cutting resulting in at least one of the first and second major surfaces, the cutting imparting a surface roughness to at least one of the first and second column ends of at least one of the polymeric columns.

10. The light control film of claim 9, wherein the cutting imparts a pattern comprising a plurality of substantially straight substantially parallel features to the at least one of the first and second major surfaces.

11. A display system comprising a light source, and the light control film of claim 1 disposed between an optical sensor and a display panel configured to generate an image for viewing by a user, the light source configured to emit a light toward at least a finger of the user disposed proximate the display panel, the optical sensor configured to at least sense a presence of the finger by receiving at least a portion of the emitted light reflected by the finger.

12. A light control film comprising a plurality of optically transparent spaced apart polymeric fiber cores substantially surrounded by a common light absorbing polymeric cladding, the fiber cores comprising corresponding fiber core ends seemingly irregularly arranged at a major surface of the light control film, such that an average radial power spectral density of the fiber core ends as a function of a spatial frequency in a cross-section of the light control film in a plane substantially orthogonal to a thickness direction of the light control film comprises a first peak region comprising one or more local peaks and defined by a full width at half maximum (FWHM) of between about 5 and about 150 inverse mm.

13. The light control film of claim 12, wherein a FWHM of a Gaussian curve fitted to the first peak region is between about 10 and about 150 inverse mm.

14. The light control film of claim 12, wherein for a substantially collimated incident light having a visible wavelength in a visible wavelength range from about 420 nm to about 680 nm, an optical transmittance of the light control film versus an incident angle of the incident light has a peak transmittance of greater than about 2% with a corresponding full width at half maximum (FWHM) of between about 5 degrees and about 120 degrees.

15. A display system comprising a light source, and the light control film of claim 12 disposed between an optical sensor and a display panel configured to generate an image for viewing by a user, the light source configured to emit a light toward at least a finger of the user disposed proximate the display panel, the optical sensor configured to at least sense a presence of the finger by receiving at least a portion of the emitted light reflected by the finger.

16. A method of fabricating a light control film, the method comprising, in sequence:

providing a plurality of substantially parallel optically transparent first polymeric columns extending along a same first direction and disposed in, and substantially surrounded by, a light absorbing polymeric material, the first polymeric columns defining a plurality of substantially optically transparent gaps therebetween, each of the first polymeric columns comprising a polymeric fiber core and having a lateral cross-sectional first shape; and applying at least one of pressure and heat to the plurality of first polymeric columns along at least one second direction substantially orthogonal to the first direction, the at least one of pressure and heat at least reducing a size of at least some of the gaps and modifying each of the first polymeric columns to a corresponding second polymeric column having a lateral cross-sectional second shape different than the cross-sectional first shape of the first polymeric column.

17. The method of claim 16, wherein applying the at least one of pressure and heat results in the light absorbing polymeric material bonding the second polymeric columns to one another to form an integral block of the second polymeric columns.

18. The method of claim 17, further comprising cutting the integral block of the second polymeric columns.

19. The method of claim 16, wherein the first shape is circular and the second shape is polygonal.

* * * * *